(12) United States Patent
Mizutome et al.

(10) Patent No.: US 6,943,845 B2
(45) Date of Patent: Sep. 13, 2005

(54) APPARATUS AND METHOD FOR DATA PROCESSING, AND STORAGE MEDIUM

(75) Inventors: Atsushi Mizutome, Kanagawa (JP); Akio Saito, Kanagawa (JP); Tomoyuki Ohno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 10/014,397

(22) Filed: Dec. 14, 2001

(65) Prior Publication Data

US 2002/0078447 A1 Jun. 20, 2002

(30) Foreign Application Priority Data

Dec. 15, 2000 (JP) .................................... 2000-382018
Dec. 6, 2001 (JP) .................................... 2001-373124

(51) Int. Cl.[7] ............................................. H04N 5/445
(52) U.S. Cl. ....................... 348/555; 348/553; 348/552; 348/564; 348/567; 348/588; 345/204; 345/531; 725/40
(58) Field of Search ................................ 348/553, 552, 348/555, 556, 423.1, 564, 563, 565, 567, 584, 588; 345/204, 10, 531, 532, 818; 725/39, 40, 43

(56) References Cited

U.S. PATENT DOCUMENTS 5,959,688 A * 9/1999 Schein et al. ................ 725/49
6,346,971 B1 * 2/2002 Numata ....................... 348/564
6,377,309 B1 * 4/2002 Ito et al. ...................... 348/554
6,384,868 B1 * 5/2002 Oguma ........................ 348/564
6,462,784 B1 * 10/2002 Kohno et al. ................ 348/563
6,493,008 B1 * 12/2002 Yui .............................. 345/840
6,493,038 B1 * 12/2002 Singh et al. ................. 348/565
6,538,675 B2 * 3/2003 Aratani et al. .............. 345/856
6,732,369 B1 * 5/2004 Schein et al. ................. 725/39
6,732,371 B1 * 5/2004 Lee et al. ...................... 725/41

FOREIGN PATENT DOCUMENTS

JP   2000-305543   11/2000

* cited by examiner

Primary Examiner—John Miller
Assistant Examiner—Jean W. Désir
(74) Attorney, Agent, or Firm—Fitzpatrick, Cella, Harper & Scinto

(57) ABSTRACT

A technology is disclosed to enable a transfer to be made quickly and easily to a screen layout and an audio output mode preferred by a user when there is a change in an input source. Past viewing and listening history information regarding the attribute and the output state of an input source is stored beforehand, for example, which input source was viewed and listened to in what screen and audio structure, or which multi-window displaying a transfer was made to when an interrupt input source came in, depending on a relationship with a video being viewed and listened to at the time. Then, when an image regarding the input source is displayed, a screen layout and an audio output state are determined, and controlled based on the viewing and listening history information.

6 Claims, 28 Drawing Sheets

FIG. 5

| INPUT SOURCE ID |
|---|
| MEDIA |
| (GENRE) |
| (TITLE) |
| (CHANNEL) |
| (THE WHOLE PROGRAM TIME) |
| START TIME |
| APPLICATION |
| RESERVED |

FIG. 6

| INPUT SOURCE ID |
|---|
| (WINDOW NO.) |
| WINDOW START ADDRESS |
| X DIRECTION SIZE |
| Y DIRECTION SIZE |
| DISPLAY EFFECT |
| LAYER |
| RESERVED |

FIG. 7

| INPUT SOURCE ID |
|---|
| OUTPUT CHANNEL |
| AUDIO MODE |
| RESERVED |

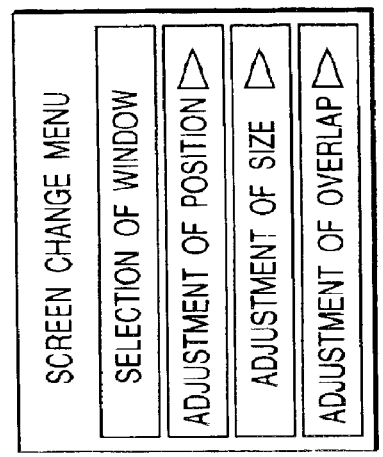
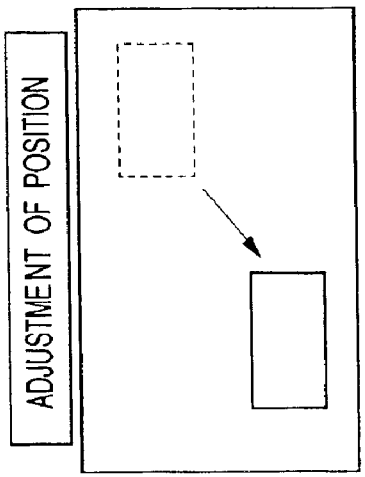
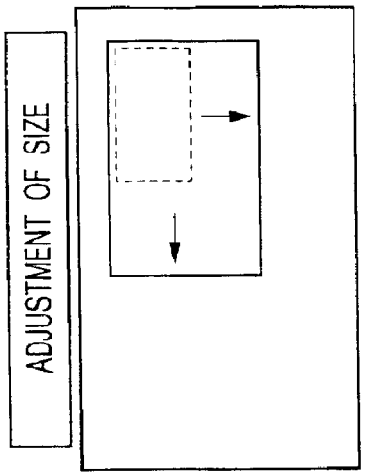

| INPUT SOURCE (ATTRIBUTE) | | | | | SCREEN LAYOUT | | | | | AUDIO | | | | | VIEWING AND LISTENING PATTERN |
|---|---|---|---|---|---|---|---|---|---|---|---|---|---|---|---|
| #1 | #2 | #3 | #4 | #5 | #1 | #2 | #3 | #4 | #5 | #1 | #2 | #3 | #4 | #5 | |
| TV2 | - | - | - | - | L1 | - | - | - | - | M1 | - | - | - | - | A |
| TV3 | TV2 | - | - | - | L1 | L2 | - | - | - | M2 | S1 | - | - | - | B |
| TV4 | ITN1 | - | - | - | L3 | L4 | - | - | - | M2 | M5 | - | - | - | C |
| EXT1 | ITN2 | - | - | - | L1 | L9 | - | - | - | M3 | M5 | - | - | - | D |
| TV3 | ITN2 | - | - | - | L3 | L4-1/2 | - | - | - | M1 | M5 | - | - | - | E |
| TV1 | DATA1 | T1 | - | - | L3 | L10 | L11 | - | - | M4 | M5 | M5 | - | - | F |
| TV1 | DATA1 | T1 | DATA2 | - | L3 | L12 | L13 | L14 | - | M4 | M5 | M5 | M5 | - | G |
| TV1 | DATA1 | T1 | DATA2 | DATA3 | L15 | L12 | L13 | L14 | L16 | M4 | M5 | M5 | M5 | M5 | H |

MEANING OF MARK

INPUT SOURCE
TV1: MEDIA=DIGITAL TV BROADCAST  GENRE=NEWS
TV2: MEDIA=DIGITAL TV BROADCAST  GENRE=SPORT
TV3: MEDIA=DIGITAL TV BROADCAST  GENRE=DRAMA
TV4: MEDIA=DIGITAL TV BROADCAST  GENRE=DOCUMENTARY
EXT1: MEDIA=1394 CONNECTION DEVICE  GENRE=MOVIE
ITN1: MEDIA=INTERNET  APPLICATION=INTERNET BROWSER
ITN2: MEDIA=INTERNET  APPLICATION=E-MAIL
DATA1: MEDIA=DIGITAL DATA TRANSMISSION  GENRE=NEWS
DATA2: MEDIA=DIGITAL DATA TRANSMISSION  GENRE=WEATHER REPORT
T1: MEDIA=INTERNAL FUNCTION  APPLICATION=CLOCK DISPLAY

SCREEN LAYOUT
L1: PARAMETER OF WIDE FULL SCREEN DISPLAY
L2: PARAMETER OF 1/8 SIZE PinP DISPLAY AT SCREEN LOWER RIGHT
L3: WINDOW OF 2/3 SIZE AT SCREEN LEFT HALF
L4-1: WINDOW OF 1/16 SIZE AT SCREEN CENTRAL PART
L4-2: WINDOW OF 1/3 SIZE AT SCREEN RIGHT HALF
L5 TO L16: DISPLAY PARAMETER OF WINDOW LAYOUT SHOWN IN ANOTHER FIGURE
L9: PARAMETER OF ICON DISPLAY AT SCREEN LOWER RIGHT

AUDIO MODE
M1: OUTPUT CHANNEL=MAIN SPEAKER  MODE=STEREO
M2: OUTPUT CHANNEL=MAIN SPEAKER  MODE=MULTICHANNEL STEREO 1
M3: OUTPUT CHANNEL=MAIN SPEAKER  MODE=MULTICHANNEL STEREO 2
M4: OUTPUT CHANNEL=MAIN SPEAKER  MODE=TWO LANGUAGES
M5: NON-AUDIO
S1: OUTPUT CHANNEL=HEADPHONE  MODE=STEREO

FIG. 12

SPORT TV2
DISPLAY PARAMETER L1

DRAMA TV3
DISPLAY PARAMETER L1

SPORT TV2
DISPLAY PARAMETER L2

DOCUMENTARY TV4
DISPLAY PARAMETER L3

HOMEPAGE BROWSER ITN1
DISPLAY PARAMETER L4-2

MOVIE EXIT1
DISPLAY PARAMETER L1

E-MAIL ARRIVAL ITN2
DISPLAY PARAMETER L9
(ICON DISPLAY)

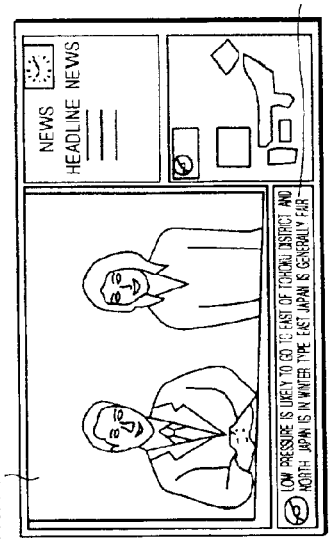
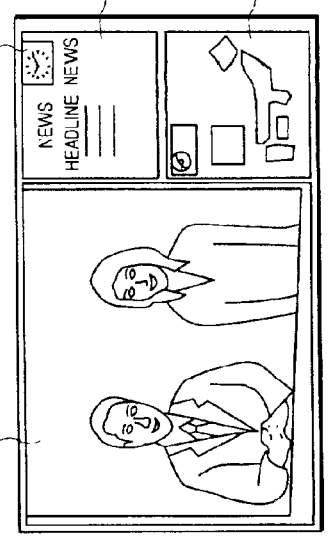
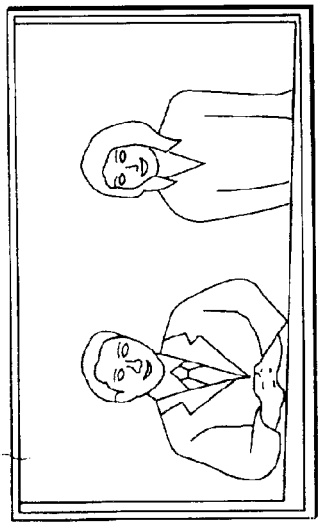
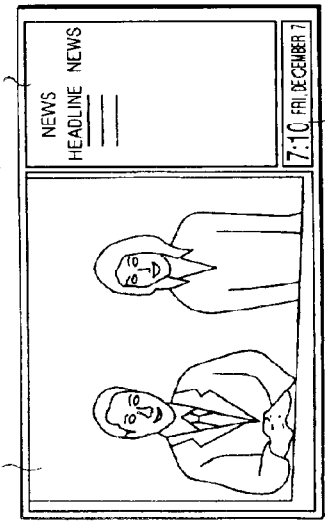
FIG. 18A
FIG. 18B
FIG. 18C
FIG. 18D

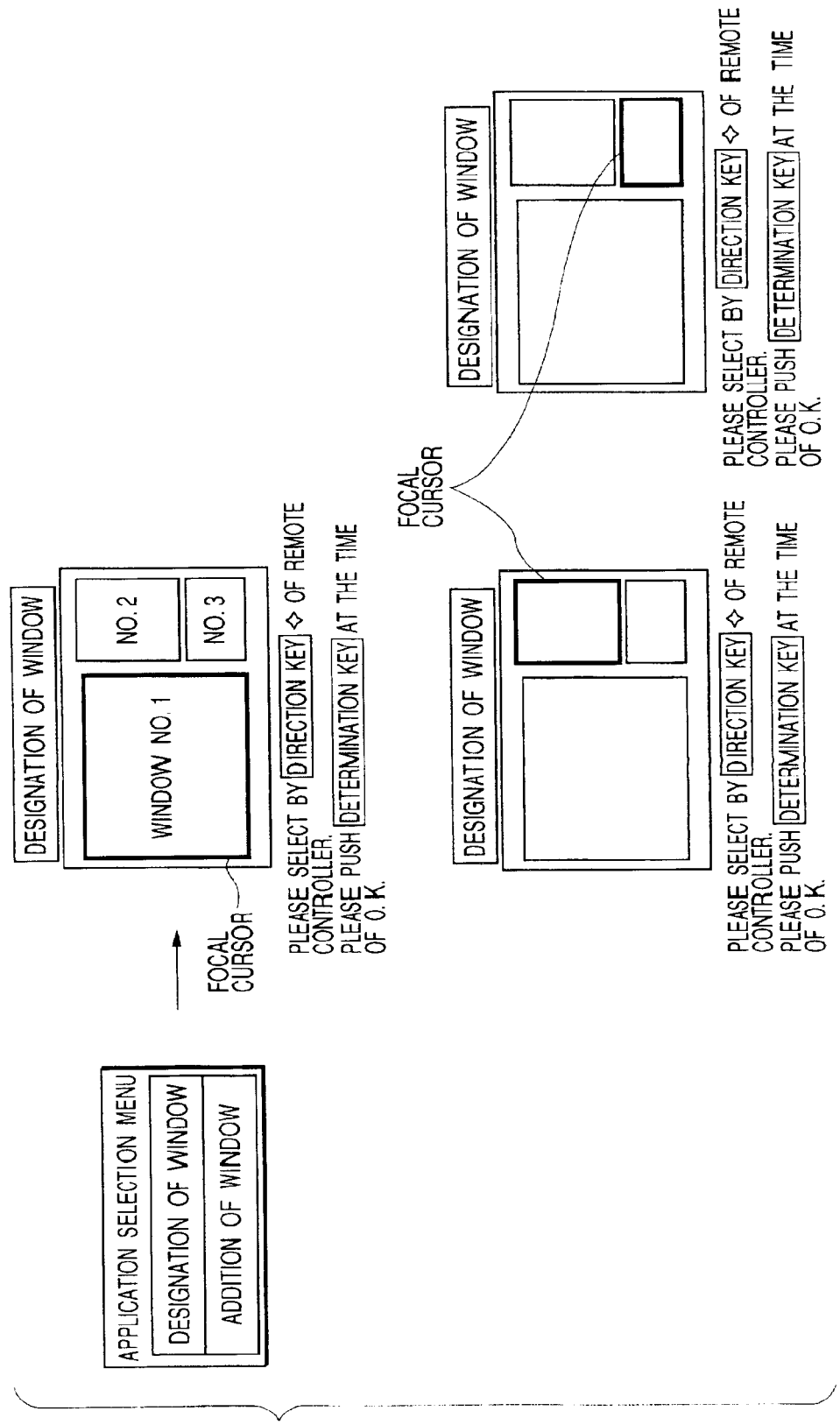

FIG. 21

| TIME ZONE | | INPUT SOURCE (ATTRIBUTE) | | | | SCREEN LAYOUT | | | | VIEWING AND LISTENING | | | | VIEWING AND LISTENING PATTERN |
|---|---|---|---|---|---|---|---|---|---|---|---|---|---|---|
| DAY OF THE WEEK | TIME | #1 | #2 | #3 | #4 | #1 | #2 | #3 | #4 | #1 | #2 | #3 | #4 | |
| MON.-FRI. | 6-7 | TV1 | DATA1 | T1 | DATA2 | L1 | L2 | L3 | L4 | M3 | S2 | M5 | M5 | A |
| MON.-FRI. | 7-8 | TV2 | DATA1 | T1 | DATA3 | L1 | L2 | L3 | L4 | M3 | S2 | M5 | M5 | B |
| SUNDAY | 12-1230 | TV3 | — | — | — | L5 | — | — | — | M1 | — | — | — | C |
| MON.-FRI. | 19-1950 | TV2 | — | — | — | L5 | L6 | — | — | M1 | S1 | — | — | D |
| WEDNESDAY | 20-21 | TV3 | TV4 | — | — | L5 | — | — | — | M1 | — | — | — | E |
| TUESDAY | 21-23 | TV5 | — | — | — | L5 | — | — | — | M2 | — | — | — | F |
| TUESDAY | 21-23 | TV5 | ITN1 | — | — | L5 | L7 | — | — | M2 | M5 | — | — | G |

MEANING OF MARK

INPUT SOURCE
TV1 : MEDIA=DIGITAL TV BROADCAST  GENRE=NEWS  Ch=8
TV2 : MEDIA=DIGITAL TV BROADCAST  GENRE=NEWS  Ch=1
TV3 : MEDIA=DIGITAL TV BROADCAST  GENRE=VARIETY Ch
TV4 : MEDIA=DIGITAL TV BROADCAST  GENRE=SPORT Ch
TV5 : MEDIA=DIGITAL TV BROADCAST  GENRE=MOVIE Ch
ITN1: MEDIA=INTERNET  APPLICATION=E-MAIL
DATA1 : MEDIA=DIGITAL DATA TRANSMISSION  GENRE=NEWS
DATA2 : MEDIA=DIGITAL DATA TRANSMISSION  GENRE=WEATHER REPORT
DATA3 : MEDIA=DIGITAL DATA TRANSMISSION  GENRE=TRAFFIC INFORMATION
T1 : MEDIA=INTERNAL FUNCTION  APPLICATION=CLOCK DISPLAY

SCREEN LAYOUT
L1 TO L7: DISPLAY PARAMETER OF WINDOW LAYOUT SHOWN IN ANOTHER FIGURE

AUDIO MODE
M1 : OUTPUT CHANNEL=MAIN SPEAKER  MODE=STEREO
M2 : OUTPUT CHANNEL=MAIN SPEAKER  MODE=MULTICHANNEL STEREO 1
M3 : OUTPUT CHANNEL=MAIN SPEAKER  MODE=TWO LANGUAGES
M5 : NON-AUDIO
S1 : OUTPUT CHANNEL=HEADPHONE  MODE=STEREO
S2 : OUTPUT CHANNEL=HEADPHONE  MODE=TWO LANGUAGES

NEWS TV1
SCREEN LAYOUT L1
AUDIO M3
(MAIN SPEAKER/TWO LANGUAGES)

NEWS T1
SCREEN LAYOUT L3
AUDIO M5 (NON-AUDIO)

NEWS DATA1
SCREEN LAYOUT L2
AUDIO S2
(HEADPHONE/TWO LANGUAGES)

WEATHER REPORT DATA2
SCREEN LAYOUT L4
AUDIO M5 (NON-AUDIO)

NEWS TV2
SCREEN LAYOUT L1
AUDIO M3

CLOCK DISPLAY T1
SCREEN LAYOUT L3
AUDIO M5

NEWS DATA1
SCREEN LAYOUT L2
AUDIO S2

TRAFFIC INFORMATION DATA3
SCREEN LAYOUT L4
AUDIO M5

VARIETY Ch TV3
SCREEN LAYOUT L5 (WIDE FULL SCREEN)
AUDIO M1 (MAIN SPEAKER/STEREO)

VARIETY Ch TV3
SCREEN LAYOUT L5 (WIDE FULL SCREEN)
AUDIO M1 (MAIN SPEAKER/STEREO)

VARIETY Ch TV4
SCREEN LAYOUT L6 (LOWER RIGHT 1/8 SIZE PinP)
AUDIO S1 (HEADPHONE/STEREO)

FIG. 26
MOVIE TV5
SCREEN LAYOUT L5 (WIDE FULL SCREEN)
AUDIO M2 (MAIN SPEAKER/MULTICHANNEL STEREO)
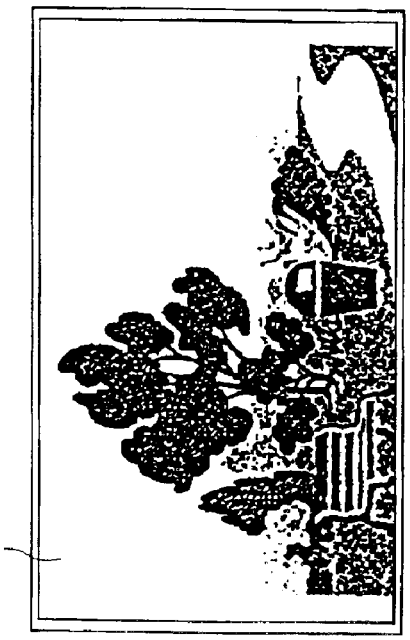
MOVIE TV5
SCREEN LAYOUT L5 (WIDE FULL SCREEN)
AUDIO M2 (MAIN SPEAKER/MULTICHANNEL STEREO)
E-MAIL ARRIVAL ITN1
SCREEN LAYOUT L7 (ICON DISPLAY)
AUDIO M5 (NON-AUDIO)

FIG. 34

| USER/USER GROUP | INPUT SOURCE (ATTRIBUTE) | | | | | SCREEN LAYOUT | | | | | AUDIO | | | | | VIEWING AND LISTENING PATTERN |
|---|---|---|---|---|---|---|---|---|---|---|---|---|---|---|---|---|
| | #1 | #2 | #3 | #4 | #5 | #1 | #2 | #3 | #4 | #5 | #1 | #2 | #3 | #4 | #5 | |
| SINGLE A | TV2 | – | – | – | – | L1 | – | – | – | – | M1 | – | – | – | – | A |
| GROUP 1 | TV3 | TV2 | – | – | – | L1 | L2 | – | – | – | M2 | S1 | – | – | – | B |
| SINGLE A | TV4 | ITN1 | – | – | – | L3 | L4 | – | – | – | M2 | M5 | – | – | – | C |
| GROUP 2 | TV5 | DATA1 | – | – | – | L3 | L4 | – | – | – | M1 | S1 | – | – | – | D |
| SINGLE A | EXT1 | ITN2 | – | – | – | L1 | L9 | – | – | – | M1 | – | – | – | – | E |
| SINGLE A | TV3 | ITN2 | – | – | – | L1/L3 | L4-1/-2 | – | – | – | M1 | M5 | – | – | – | F |
| GROUP 3 | TV1 | DATA1 | T1 | DATA2 | – | L3 | L5 | L6 | L7 | – | M4 | M5 | M5 | – | – | G |

MEANING OF MARK

INPUT SOURCE
TV1: MEDIA=DIGITAL TV BROADCAST  GENRE=NEWS
TV2: MEDIA=DIGITAL TV BROADCAST  GENRE=SPORT
TV3: MEDIA=DIGITAL TV BROADCAST  GENRE=DRAMA
TV4: MEDIA=DIGITAL TV BROADCAST  GENRE=DOCUMENTARY
TV5: MEDIA=DIGITAL TV BROADCAST  GENRE=ANIMATION
ITN1: MEDIA=INTERNET  APPLICATION=INTERNET BROWSER
ITN2: MEDIA=INTERNET  APPLICATION=E-MAIL
DATA1: MEDIA=DIGITAL DATA TRANSMISSION  GENRE=NEWS
DATA2: MEDIA=DIGITAL DATA TRANSMISSION  GENRE=WEATHER REPORT
T1: MEDIA=INTERNAL FUNCTION  APPLICATION=CLOCK DISPLAY

SCREEN LAYOUT
L1: PARAMETER OF WIDE FULL SCREEN DISPLAY
L2: PARAMETER OF 1/8 SIZE PinP DISPLAY AT SCREEN LOWER RIGHT
L3: WINDOW OF 2/3 SIZE AT SCREEN LEFT HALF
L4-1: WINDOW OF 1/16 SIZE AT SCREEN CENTRAL PART
L4-2: WINDOW OF 1/3 SIZE AT SCREEN RIGHT HALF
L5 TO L7: DISPLAY PARAMETER OF WINDOW LAYOUT SHOWN IN ANOTHER FIGURE
L9: PARAMETER OF ICON DISPLAY AT SCREEN LOWER RIGHT

AUDIO MODE
M1: OUTPUT CHANNEL=MAIN SPEAKER  MODE=STEREO
M2: OUTPUT CHANNEL=MAIN SPEAKER  MODE=MULTICHANNEL STEREO 1
M4: OUTPUT CHANNEL=MAIN SPEAKER  MODE=TWO LANGUAGES
M5: NON-AUDIO
S1: OUTPUT CHANNEL=HEADPHONE  MODE=STEREO

SPORT TV2
DISPLAY PARAMETER L1

DOCUMENTARY TV4
DISPLAY PARAMETER L3

HOMEPAGE BROWSER ITN1
DISPLAY PARAMETER L4

DRAMA TV3
DISPLAY PARAMETER L1

SPORT TV2
DISPLAY PARAMETER L2

ANIMATION TV5
DISPLAY PARAMETER L3

DATA BROADCASTING DATA1
DISPLAY PARAMETER L4

APPARATUS AND METHOD FOR DATA PROCESSING, AND STORAGE MEDIUM

BACKGROUND OF THE INVENTION

1. Field of the Invention

The present invention relates to an apparatus and a method for data processing, which are provided to output image data, audio data, and so on, to a display device or an audio output device, and a storage medium containing a program stored to execute the data processing method.

2. Description of the Related Art

At present, information has been distributed home from a wide variety of media. For example, a TV or radio image/audio broadcast, and a character broadcast have been provided through a ground wave, a communication satellite, a CATV cable network, and others. On the other hand, image, audio and character data, and so on, have been provided through a communication line network, e.g., Internet, and E-mail.

In addition, in recent years, a so-called digital broadcasting system has gained in popularity, which is designed to digitize and then transmit a television signal through a communication satellite (CS) broadcast, cable TV (CATV) or the like. This system employs a digital compression/transmission technology, and thereby enables even several hundreds of channels to be secured. As a result, much more television/radio (music) programs than that in the conventional case can now be provided.

Moreover, with the progress in the digitization of AV devices, a larger number of video, and audio sources as package media (medium), e.g., a digital video disk (DVD), a digital video (DV), a digital camera, and so on, are present at home.

Therefore, to enable users to receive and enjoy a wide variety of services including video, audio and character information from various media, a multi-window function has recently been realized, which is designed to simultaneously open a plurality of windows on a large display, and allocate different information input sources to the respective windows. Moreover, it is expected that the future digitization of broadcasting and establishment of a communication infrastructure will increase the number of input routes home for video, audio and character information, and the amount of information, resulting in greater increases in the number of windows and the amount of information to be displayed on the display.

It is also expected that because of the Internet connecting function of a TV receiver, a case will become general, where information regarding a program is obtained through the internet during viewing and listening, or the arrival of E-mail occurs during the viewing and listening of a given video. In addition, there may also be a case, where fixed time receiving by a schedule control function, a timer or the like as a TV accessory function generates an interrupt display event.

Under such circumstances, the function of the multi-window provides one solution as it can simultaneously display a plurality of videos and information. In the conventional multi-window control system, however, the user must change a screen layout or input source switching each time, necessitating considerable time and labor to achieve a screen layout preferred by the user. For example, in the case of 2-screen display of the TV receiver, the user must first select the 2-screen display and, after the switching has been made to the 2-screen display, the user must execute selection and setting so as to display desired input sources on the respective screens.

In other words, to receive and enjoy videos and information supplied from a wide variety of media in a really smooth manner, it is important to select the screen layout of the multi-window and audio when a plurality of input sources are simultaneously viewed and listened to, and to transfer to the multi-window when an interrupt display request event is generated without troubling the user.

Moreover, in the case of the TV receiver or the like, there are frequently a plurality of users (group users), not just one individual user, for one device. It is thus necessary to satisfy the above-described request for each of the plurality of users.

SUMMARY OF THE INVENTION

The present invention was made against the foregoing background, specifically to solve the problems inherent in the conventional art, and it is an object of the invention to provide a data processing apparatus for displaying or outputting information regarding a video, audio, and so on, which enables a video or audio to be quickly and easily viewed and listened to, in the viewing and listening form of a screen layout, an audio output mode or the like preferred by a user.

It is another object of the invention to provide a multi-window system for simultaneously displaying information regarding a plurality of videos, audio, and so on, on a plurality of windows, which enables a video or audio be quickly and easily viewed and listened to, in the viewing and listening form of a screen layout, an audio output mode, or the like preferred by a user.

In accordance with the invention, one of the embodiments to achieve the object is presented in "an apparatus according to claim 1".

Other objects and features of the invention will become apparent upon reading of the detailed description of the embodiments with reference to the accompanying drawings.

BRIEF DESCRIPTION OF THE DRAWINGS

FIG. 5 is a view showing a structure example of attribute data of an input source;

FIG. 6 is a view showing a structure example of a display parameter;

FIG. 7 is a view showing a classification example of an output channel;

FIGS. 10A, 10B and 10C are views, each showing an example of an operation guide display when a screen and audio are changed;

FIG. 12 is a view showing an example of a history database;

FIGS. 18A, 18B, 18C and 18D are views, each showing an example of a morning viewing and listening pattern of a given user;

FIG. 19 is a view showing an example of a selection guide by a focal cursor movement;

FIG. 21 is a view showing a structure example of a history database;

FIG. 26 is a view showing an example of a screen layout when E-mail arrives;

FIG. 34 is a view showing a part of a viewing and listening pattern history database;

DETAILED DESCRIPTION OF THE PREFERRED EMBODIMENTS

Next, detailed description will be made of the preferred embodiments of the present invention with reference to the accompanying drawings.

First Embodiment

Figure 1:
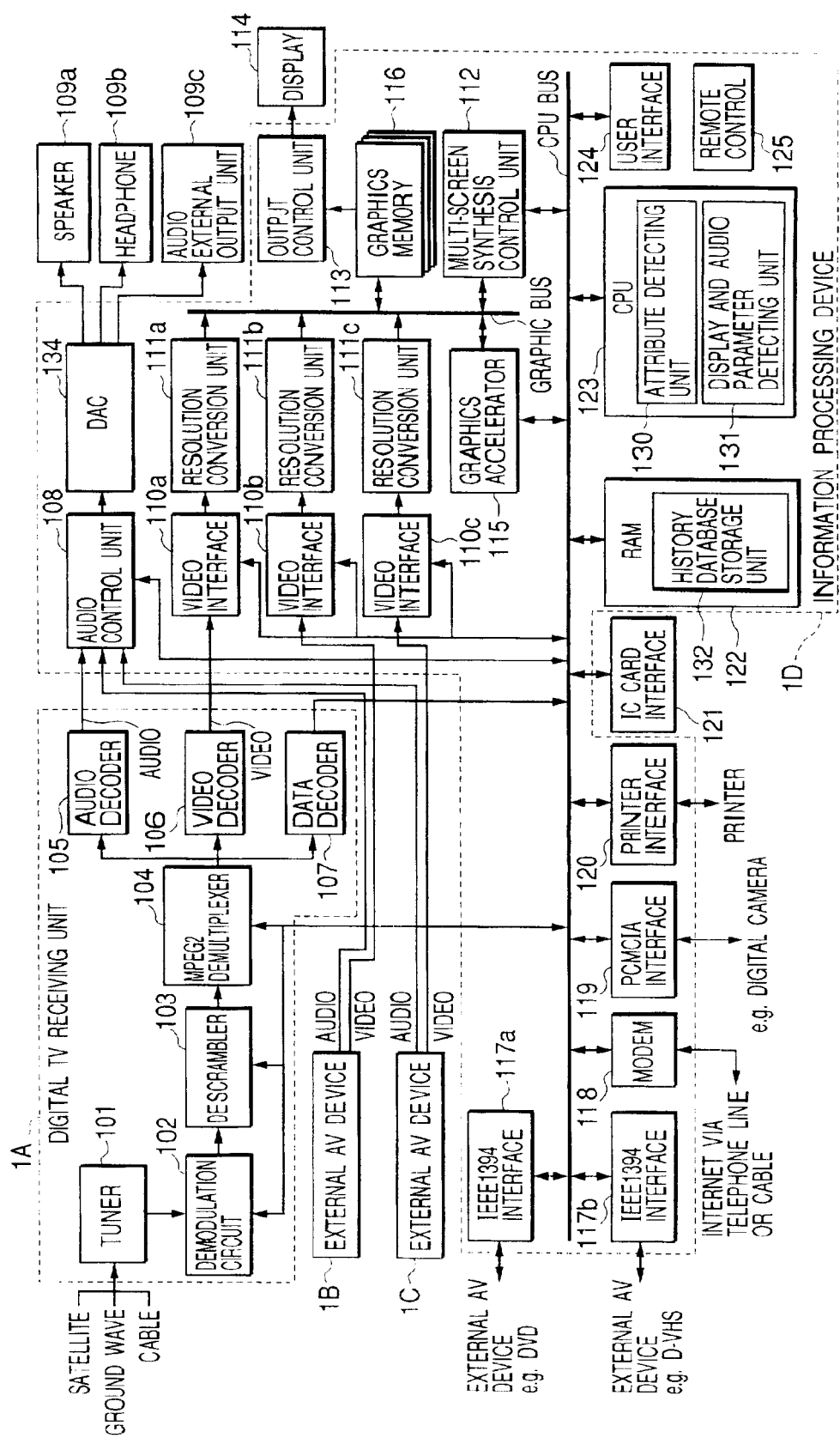
FIG. 1 is a block diagram showing main portions of an integrated receiving system including a data processing apparatus according to a first embodiment of the present invention.

FIG. 1 shows the main blocks of an integrated receiving system, to which a data processing apparatus according to the first embodiment of the invention is applied. In FIG. 1, a reference numeral 1A denotes a digital TV receiving unit. A tuner 101 selects and receives a radio wave having a predetermined frequency among digital television broadcast waves transmitted through a TV antenna or a cable. The broadcast wave selected and received by the tuner 101 is sent to a digital data demodulation circuit 102, where it is subjected to demodulation, A/D conversion, and error correction. Then, at a transport descrambler 103, descrambling is carried out for limited receiving, and a data row called a transport stream (TS) is generated. In this case, management data (EMM and ECM) for limited receiving, sent in by being superposed on the broadcast wave is extracted, and sent to an IC card interface 121. If it is a program compliant with a contact condition read from an IC card owned by a user, processing is carried out to enable video, and audio data to be decoded in a next stage and after.

An MPEG 2 transport demultiplexer 104 divides the entered transport stream into a video stream, an audio stream and a stream related to data transmission, and rebuilds the streams. Normally, one transport stream includes a plurality of multiplexed programs and, from one satellite transponder, for example, a plurality of transport streams are transmitted. Accordingly, to select one channel, information (PID, PAT, NIT or the like) regarding a desired channel is extracted from program specific information (PSI) separated by the MPEG 2 transport demultiplexer 10, and then station selecting operation is carried out.

A video decoder 106 and an audio decoder 105 respectively decode video and audio MPEG 2 streams. A decoded audio signal is sent to an audio control unit 108; a decoded video signal to the video interface 110a of a next stage. A data decoder 107 decodes a stream related to data transmission, which is sent out in BS digital broadcasting. More specifically, after DSM-CC decoding, a series of files regarding XML are stored in pre-allocated areas of a RAM 122.

Reference numerals 1B and 1C denote other external AV devices, which are connected to a data processing apparatus ID through a video/audio signal. These AV devices respectively output video signals to the video interfaces 110b and 110c of the data processing apparatus ID, and audio signals to the audio control unit 108 of the data processing apparatus ID.

In the data processing apparatus ID, the audio control unit 108 determines an output destination of an audio signal of each of a plurality of input sources displayed on a multi-window. In many cases, generally, the audio of a medium being viewed and listened to on a largest screen are reproduced by a main speaker 109a, and audio corresponding to a subwindow is heard through a headphone 109b. According to the embodiment, however, a CPU 123 determines an output destination of audio corresponding to each screen based on past viewing and listening history data. The CPU 123 selects any one of the speaker 109a, the headphone 109b and an audio external output unit 109c as an output destination of the audio. The audio control unit 108 executes control so as to output the audio corresponding to each screen according to the determined audio output destination, and outputs an audio signal to a DAC 134.

The DAC 134 subjects the entered audio signal to D/A conversion, and then outputs the audio signal to the determined output destination. An audio output destination can also be determined by direct instruction made by the user using a remote controller 125.

The video interfaces 110a, 110b and 110c are input units provided to receive video signals outputted from the digital TV receiving unit 1A, and the external AV devices 1B and 1C. In the embodiment, an analog video signal is entered to the video interface 110b as the input unit for the external AV device 1B; and a digital video signal to the video interface 110c for the external AV device 1C. The analog video interface 110b is composed of an A/D converter, a PLL circuit for generating a sampling clock, and so on, and may include a color space conversion circuit, an interlace-progressive conversion circuit, and so on, when necessary. If the entered digital video signal is a differential multiplexing signal, e.g., low voltage differential signaling, the digital video interface 110c is composed of its decoding circuit, a voltage level conversion circuit, and so on.

The data processing apparatus 1D comprises, as described above, an input port from the digital TV receiving unit 1A, and analog and digital external AV input ports, one each. In addition, as sources for entries from other paths to the data processing apparatus 1D, there are those described below.

IEEE 1394 interfaces 117a and 117b are provided to digitally connect the data processing apparatus 1D with the external AV devices, computer peripheral devices or the like. A D-VHS for picture recording, a DVD player and others are connected to these interfaces. A modem 18 functions to send information regarding a user viewing and listening record, e.g., pay broadcast utilization, through a telephone line to the control center of a broadcast provider side, and also functions as an interface for reading various home pages or transferring E-mail by being connected to the Internet. A PCMCIA interface 119 is provided to fetch various images photographed by a digital camera. A compact flash (CF) card, a smart medium and others are connected to this PCMCIA interface 119 through an adapter.

To sum up, there are following input sources to the data processing apparatus 1D.

A video, audio and data from the digital TV receiving unit.

Videos, and audio from the external AV devices 1B and 1C, which are entered in the forms of video/audio signals.

A video and audio from the DVD or the D-VHS connected through the IEEE 1394 interface.

Information regarding the Internet or E-mail connected through the modem.

Image data from the digital camera connected through the PCMIA interface.

Resolution conversion units 111a, 111b and 111c, each holding a video memory of one screen therein (not shown), temporarily store video data asynchronously entered from the video interfaces 110a, 110b and 110c, and then convert the video data into predetermined screen formats (size or number of colors) according to instructions from the CPU 123 and a multi-screen synthesis control unit 112.

Resolution conversion for the video or image data from the IEEE 1394 interfaces 117a and 117b, the modem 118 and the PCMCIA interface 119 is partially achieved by graphics accelerator 115 and a graphics memory 116.

The graphics accelerator 115 generates a frame layout or background picture for each window in a multi-window screen, an application screen for a homepage browser or mail, a graphical user interface screen for an operation menu, an icon or a button, and so on.

The graphics memory 116 has a structure composed of a plurality of planes including a moving picture plane, a static image plane, a character/graphics plane, an overlapping/switching control plane, and others, and it is adapted to perform synthesis for videos and image data from the respective input sources by the control of the multi-screen synthesis control unit 112.

The multi-screen synthesis control unit 112 reads data regarding video, image and character information from the respective input sources from the video memories of the resolution conversion units 111a to 111c in association with the CPU 123, and develop the data on the graphics memory 116 so as to set a predetermined screen layout (position, size, overlapping effect, number of colors, and so on), lastly generating a multi-screen. In the embodiment, this screen layout is controlled in a presentation state according to past user viewing and listening history, and this point will be described later.

The output control unit 113 performs control for a driving timing, conversion for a display format, and so on, according to a characteristic of a display 114 in order to output the last multi-screen window to the display 114. For the display 114, a plasma display or a projection monitor compliant with large-screen and high-definition television should preferably be selected for the purpose of utilizing a multi-window effect. From the output control unit 113, display data is outputted by a timing corresponding to such a display and in a display format.

A printer interface 120 is a port, to which a printer is connected literally. This printer interface 120 is used to edit/print an image entered from the digital camera, or print program related information (travel guide, cooking recipe, prize application address, various coupons, and so on) distributed by a broadcasting system including data transmission or homepage information, while making verification on the display 114 of the integrated receiving system.

The CPU 123 controls the foregoing constitution in an integrated manner. Specifically, the CPU 123 identifies, judges and processes of various tables regarding the PSI in the digital broadcasting system (tuner selection, extraction and processing of EPG related information, and so on), processes an XML related file sent through data transmission, controls the displaying of the resolution conversion unit 111 or the multi-screen synthesis control unit 112, controls the audio of the audio control unit 108, controls the interface with the external device such as the modem 118 or the IEEE 1394 interface 117, controls the user interface 124 including the remote controller 125, and so on. In addition, the CPU 123 includes an attribute detecting unit 130 for detecting the attribute of the input source, and a display and audio parameter detecting unit 131 for detecting a display parameter of each window, and an audio parameter of audio corresponding to each window, and executes processing programs for creating a history database, updating, and others.

The RAM 122 operates as an external memory for the CPU 123, and its part functions as a history database storage unit 132 for storing a user history database. The user interface 124 selects and operates an input medium, a television channel or the external device in association with a proper operation screen, and it is basically controlled by the remote controller 125.

Figure 2:
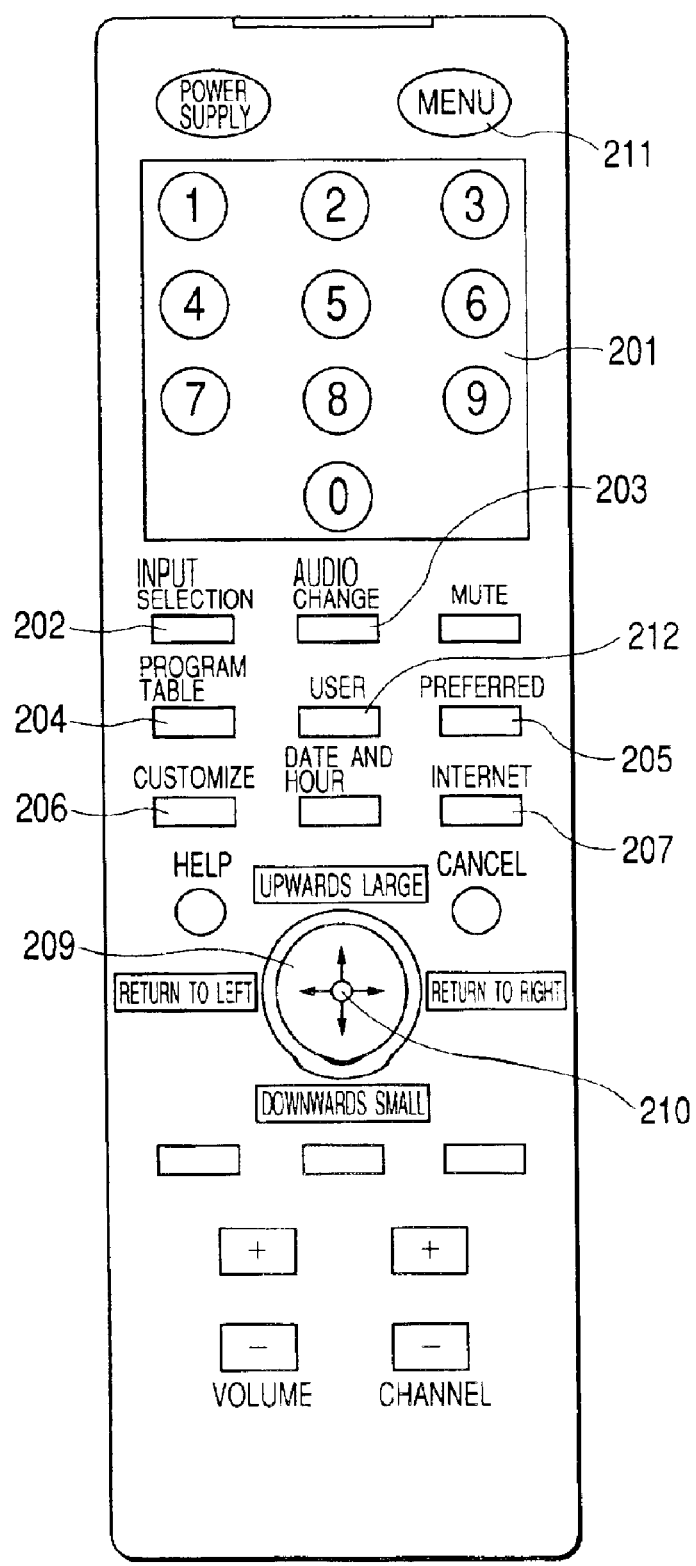
FIG. 2 is a view showing a constitutional example of a remote controller provided to operate the integrated receiving system including the data processing apparatus of the invention.

FIG. 2 shows the constitutional example of the remote controller 125 for operating each device of the integrated receiving system. Hereinafter, a main button function of the embodiment will be described based on the example of the operation procedure of the multi-window screen.

First, when a video, an image or an information source to be viewed and listened to by a user is selected by a menu button 211, a channel button 201, or an input source selection button 202, single or multi-screen displaying is carried out in a screen layout preset in the data processing device 1D. Then, by using the left and right direction (proceed to next/return) of a direction selection key 209, the user selects a preferred screen layout among several types of preset screen layouts, and selects it by pushing a determination key 210 (center part of the direction selection key).

When wishing to freely set a layout, the user first pushes a custom key 206, and then sets the position and size of each window by using the direction selection key 209. Such series of operations are carried out in accordance with an operation guide displayed on the screen and, by pushing the determination key 210, lastly, user's customized screen is registered. An operation for screen and audio changes will be described later.

Figure 3:
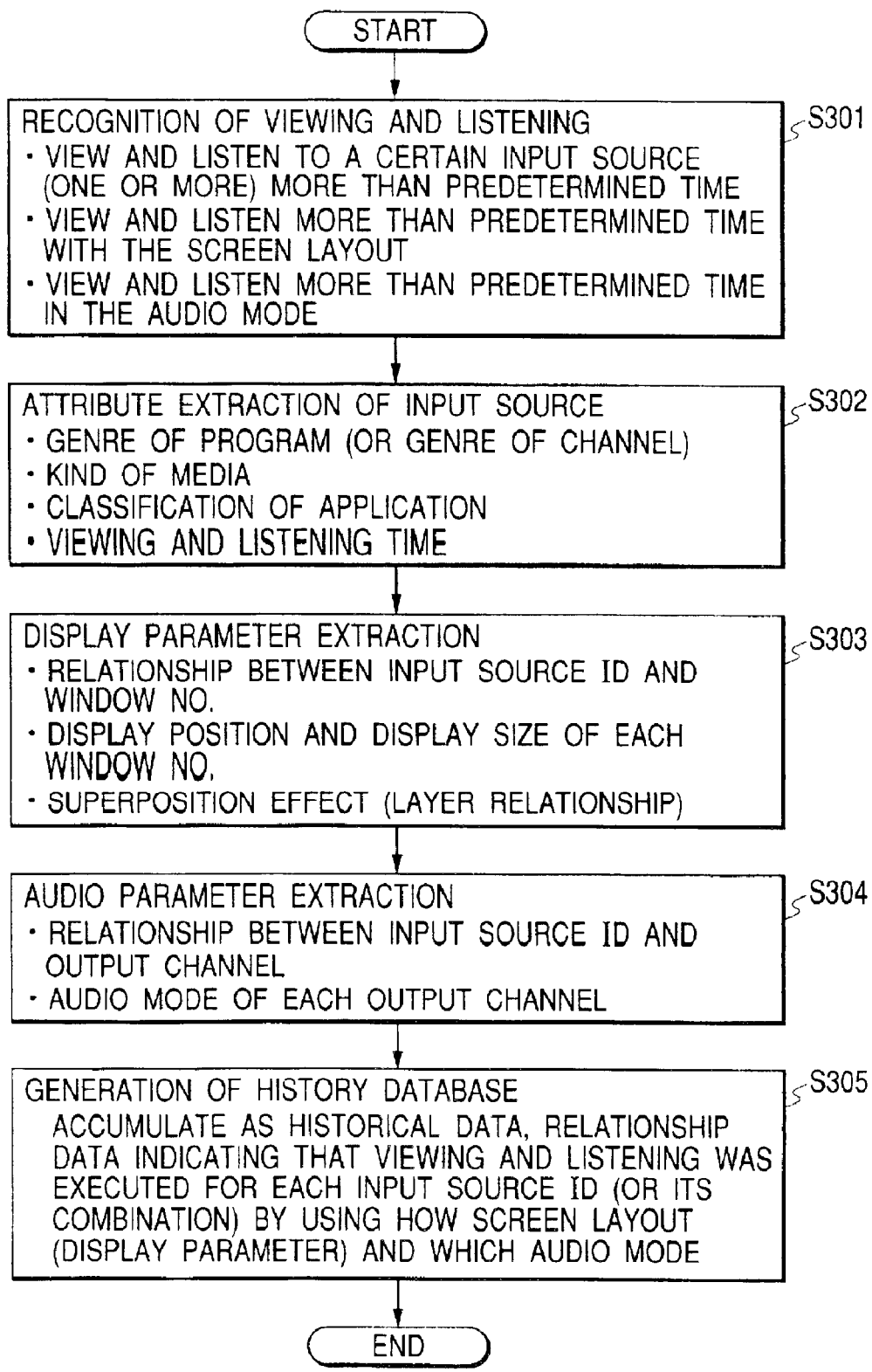
FIG. 3 is a flowchart showing an operation flow of the integrated receiving system including the data processing apparatus of the first embodiment of the invention.

Next, description will be made of the operation flow of the CPU 123 when the history database of a viewing and listening pattern is generated in the embodiment. FIG. 3 shows a basic operation flow from the detection of the attribute of information from an input source when information regarding a video, audio or a character from the input source incorporated in the CPU 123 is viewed and listened to, the detection of the state (screen layout, and audio mode) of viewing and listening each input source, to the generation of a history database 132 relating such information, and the storage of the same in the history database storage unit 132 provided in the RAM 122.

In step S301 of FIG. 3, recognition of viewing and listening is carried out. Here, if information from a given input source (channel if TV) is viewed and listened to for predetermined time or more, the viewing and listening of the information from the input source are recognized. Also for a screen layout, if fixed in the same layout for predetermined time or more, the viewing and listening in this screen layout are recognized. Recognition is similar for an audio output. These recognitions are made in order to prevent the storage of a viewing and listening pattern as history data when a so-called zapping operation is carried out, i.e., searching of a desired channel during TV channel selection.

Then, in step S302, for the information recognized as viewing and listening in step S301, the attribute of the input source is detected. FIG. 5 shows the structure example of attribute data of the input source. As shown in the drawing, first an input source ID is determined as a management number. Then, for each input source, the following attribute data are detected: (1) kind of medium, (2) genre of program or channel, title, channel number, whole program time in the case of a broadcasting system, (3) viewing and listening start time, (4) classification of application (TV, homepage browsing, E-mail, scheduler, and so on), and others, and these are managed as one data structure.

In FIG. 5, the parameters including the title, the genre, the channel and the whole program time are extracted only when they are present depending on the kind of medium, and a blank is set in the case of a medium, which is not present as data. The viewing and listening time is set to recognize the viewing and listening start time of the input source, and used as data for screen layout control when a later-described interrupt input event is generated.

In addition, the classification examples of medium kinds in the attribute data include four input kinds from the broadcasting systems of the digital TC broadcasting, the analog TV broadcasting, the digital data transmission, and the analog data transmission, the Internet (modem input), an external AV input, an input from the IEEE 1394 I/F, and an input from the PCMCIA I/F, and so on. Other than these, an input from a clock (timer) or a scheduler incorporated as an internal function in the data processing apparatus is also classified as one medium.

Next, genre classification will be described. If a medium kind in the attribute data is a data reproducing system from the TV broadcasting system or the external connection device, genre information regarding the entered information is stored as attribute data. Here, seven genres are prepared including new, sports, film, drama, variety, documentary, and education. Needless to say, there are other various genres, which are classified as others. Especially the genre among the attribute data of the input source has, in most cases, a close relationship with a screen layout, an audio mode or the like, for example sports or a film is displayed by using a large window.

In addition to the viewing and listening function of TV broadcasting, the data processing apparatus 1D includes applications for EPG display for displaying the electronic program guide (EPG) of TV broadcasting, Internet browser, E-mail, viewing and listening of the external AV device, clock display provided as an internal function, a scheduler, a calendar and others. The classifications of these applications are stored as application information in the attribute data shown in FIG. 5.

The attribute data regarding the input source, e.g., the above medium and genre classifications, are sent in by being multiplexed on a broadcast wave as service attendant information regarding a channel or a program called service description table (SDT) or event information table (EIT) in the digital TV broadcasting system. Thus, the attribute data shown in FIG. 5 can be extracted by filtering the table data at the digital TV receiving unit 1A, and processing it at the CPU 123. Regarding the external input source other than the broadcasting system, the CPU 123 detects each parameter in association with each interface input unit. In the reproducing system from the external connection device, if there genre information entered with content data, the CPU 123 detects the genre information, and stores it as attribute data.

Subsequently, in step S303 of FIG. 3, a display parameter for a video displayed on each window is extracted. FIG. 6 shows the structure example of a display parameter in the embodiment. Allocation of an input source to each window, i.e., which window is used to display each window, is carried out by the CPU 123. The display parameter data of each window includes, first, an input source ID indicating the input source of a video being displayed on the window. Since the input source ID reveals the attribute data of the input source (FIG. 5), each window and the attribute of the input source corresponding to the window are correlated with each other. In this case, a window number may be allocated to each window for management.

In addition, among display parameters shown in FIG. 6, data from a window start address to a layer are parameters regarding displaying of the respective windows. These parameters are extracted by the CPU 123 by referring to a register value regarding display control in the graphics accelerator 115. As a parameter regarding the position and size of each window, a start address (normally address on the left), an X (horizontal) direction size (number of dots), and Y (longitudinal) direction size (number of dots) are extracted. As a parameter indicating a relationship between windows or with the background screen, the layer position, the display effect (transmittance) of the window are extracted. In addition, the number of display colors for each window is managed as display parameter data when necessary.

Subsequently, in step S304, audio parameter extraction is carried out. FIG. 7 shows the structure example of audio parameter data in the embodiment. As in the case of the display parameter, the audio parameter data contains an input source ID indicating the input source of audio outputted from its output channel. Accordingly, an input source is correlated with an output channel and a mode, i.e., what attribute input source is viewed and listened to through which channel and on what mode. Here, the output channel is classified into any selected from the following five, a main speaker, a headphone, external outputs 1 and 2, and a non-audio output. Regarding the audio mode, there are monophonic, stereo, multi-channel stereo 1 and 2, and bilingual modes. The multi-channel stereo mode indicates a mode of Dolby 5.1 Ch or Dolby theater surround mode employed by the DVD. These audio relate parameters are extracted as data by the CPU 123 in association with the audio decoder 105 and the inside components of the audio control unit 108 (register setting, and mode identification).

In subsequent step S305, a relationship is rearranged between the attribute data of the input source detected in step S302, and the display and audio parameter data detected in steps S303 and S304, and a database is generated, regarding in what screen layout (display parameter) and on what audio mode various input sources were viewed and listened to. In other words, in step S305, what display and audio parameters the input source was viewed and listened to in and on for each input source ID are stored as a viewing and listening pattern, and its frequency is stored. Moreover, also when a plurality of input sources are simultaneously viewed and listened to, display and audio parameters for each combination pattern of the input source ID are stored, and their frequencies are stored.

As the history database, some viewing and listening pattern data are left as history even when the same input source ID is viewed and listened to. However, the display and audio parameters of the respective cases are stored, sorted in the order of high frequency, and stored. In addition, among the display parameters, no parameters are shown for the window start address, the X direction size, and the Y direction size, because they can take any optional values on the screen. In the case of near address and size, data rounding is carried out, and ones in a given range are stored as same data (value). Thus, a viewing and listening pattern regarding what screen and audio mode various input sources were viewed and listened to, and their frequencies are stored in the history database.

Figure 4:
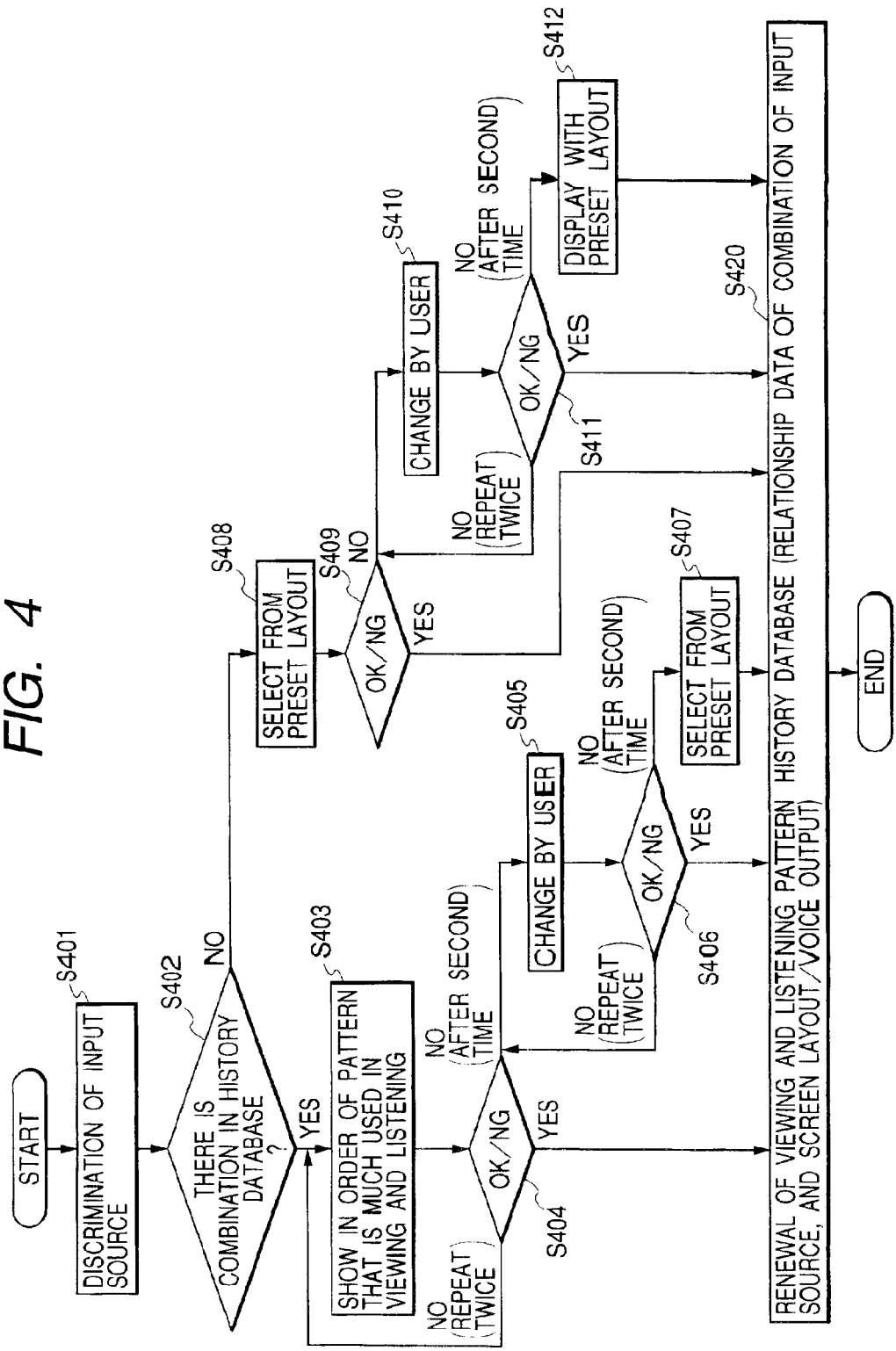
FIG. 4 is a flowchart showing a flow of a basic operation until a screen layout and an audio mode are determined in the first embodiment of the invention.

FIG. 4 shows a basic operation flow until a screen layout and an audio mode are determined when the user views and listens to a given input source. In FIG. 4, in step S401, discrimination is made as to the input source ID of a video or audio, which the user views and listens to. Here, only one input source may be selected, alternatively a plurality of input sources may be selected beforehand.

In step S401, discrimination of the input source ID selected as an input is carried out and, in step S402, based on the attribute data of the selected input source, checking is made as to whether the input source (or its combination) was viewed and listened to in the past or not, in other words, the presence of its viewing and listening pattern in the history database.

Figure 8A:
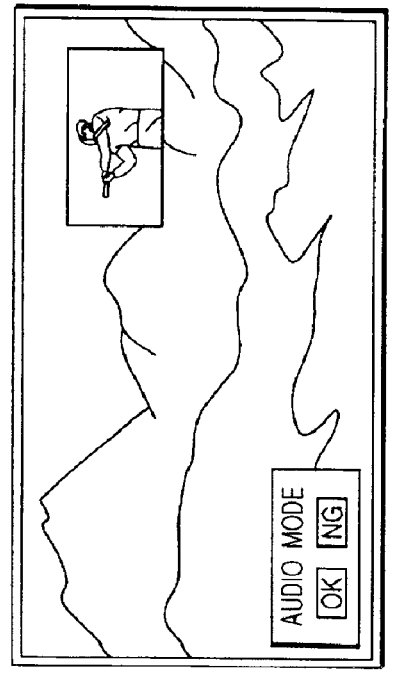
FIGS. 8A and 8B are views, each showing an example of a query screen for a user.
Figure 8B:
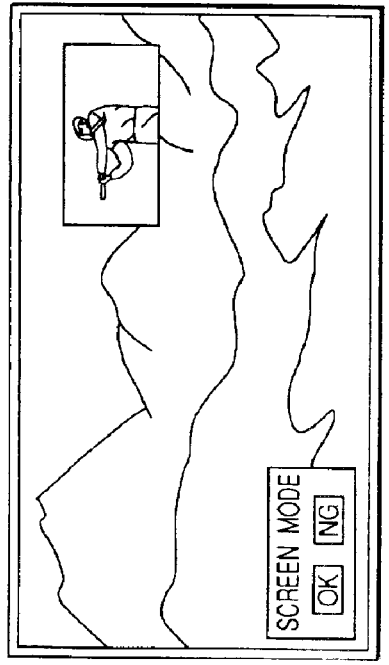
Figure 9A:
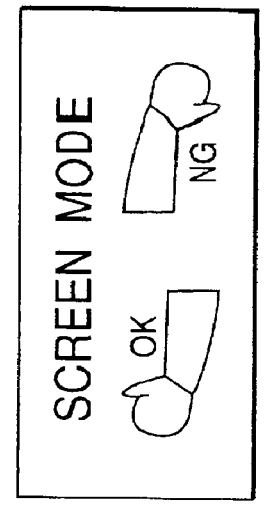
FIGS. 9A and 9B are views, each showing another example of a query screen for a user.
Figure 9B:
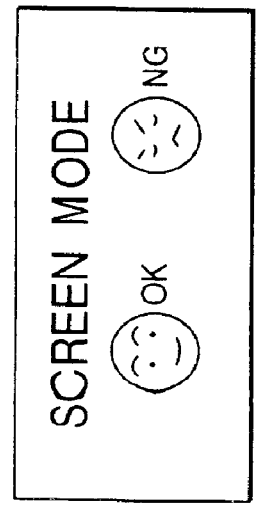
Figure 11:
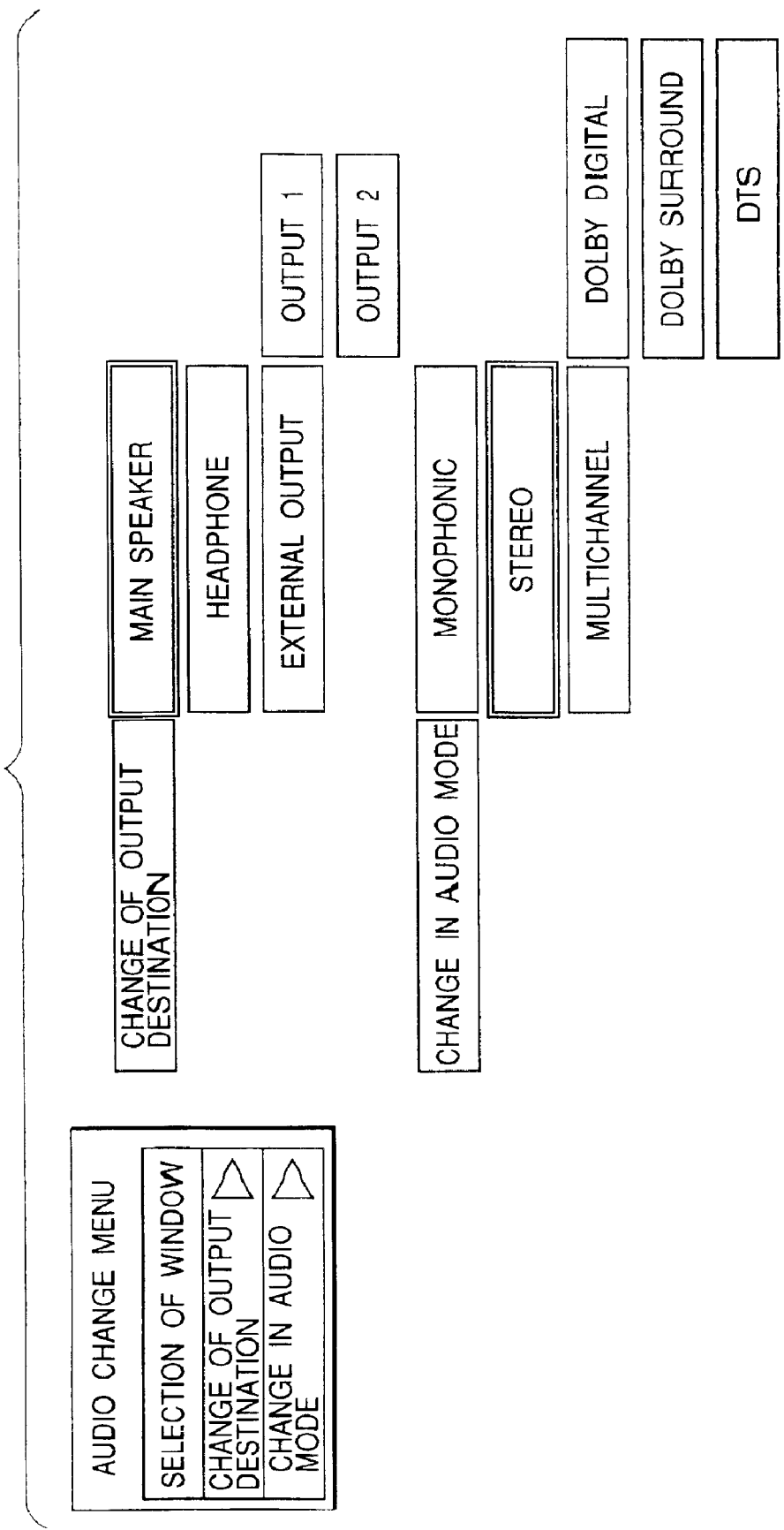
FIG. 11 is a view showing another example of an operation guide display when a screen and audio are changed.

If the viewing and listening pattern is present in the history database, first, the past viewing and listening pattern is displayed in a screen layout and an audio mode most often used (S403). A query is made to the user as to whether the shown screen layout and audio mode are OK or not (S404). Each of FIGS. 8A and 8B shows an example of a query screen (OSD display) for a user. In each of FIGS. 8A and 8B, the example is shown in the form of partially occupying a left corner of the screen being viewed and listened to. However, it is possible to display a selection verification screen (screen mode and audio mode) thereof while adjusting OSD transmittance and showing a background screen. Moreover, by presetting some patterns, and providing a graphical design display like that shown in each of FIGS. 9A and 9B, it is possible to show the screen in a manner friendly to the users of wider age groups.

If the user operates the remote controller to make selection, where a screen and audio are both OK, viewing and listening are carried out on this screen and, after the passage of predetermined time and more, the result is fed back to the attribute database (S420). Thus, the frequency of a viewing and listening pattern, most often used, is added again. If NG selection is made in step S404, then a display is made in a screen layout and an audio mode, second often used (S403), and a query is made to the user as to whether the shown screen layout and audio mode are OK or not (S404). Here, if further NG selection is made, a display is made in a screen layout and audio mode, third often used (S403), and a query is made as to whether the shown screen payout and audio mode are OK or not (S404).

In this case, as a showing processing algorithm in the embodiment, showing is carried out in order of combinations much used in the viewing and listening history database. In an actual case, each parameter constituting the viewing and listening pattern database is weighted (weighting=1, equality is established), and then a predetermined arithmetic operation is performed by the combination of several kinds of parameters. Accordingly, the user generates profiles for respective user groups, and determines the order of showing based on the profiles. As a method of generating such user profiles, various algorithms can be considered according to purposes (applications), but description thereof are omitted.

If there are not preferred showing sates among viewing and listening patterns shown three times, the process proceeds to step S405, where the user operates the remote controller to make free selection and setting. Specifically, a screen or audio change menu is called by pushing the custom key 206 of the remote controller. Then, as shown in FIG. 19, a window is selected by moving the focal cursor, and if a screen is changed, the position and size of each window are set by using the direction selection key 209. Each of FIGS. 10A, 10B, 10C, 11 and 20 shows the example of an operation guide display when a screen or audio is changed.

After the setting by the user, if OK, viewing and listening are carried out by the pattern and, as in the foregoing case, feedback is made to the history database. If NG, then rewriting is carried out twice by a change (S405) by the user. If NG continues three times or more, displaying is carried out in a preset screen layout and audio mode.

The data processing apparatus of the embodiment contains several kinds of preset screens and audio patterns. As described above, the user selects a preferred screen layout among the several kinds of preset screens and audio patterns by using the left and right directions (proceed to next/return) of the direction selection key 209 of the remote controller, and selects it by pushing the determination key 210 (center part of the direction selection key). In the case of selection in the present pattern, similarly, a change is made in the history database (S420).

On the other hand, in step S402 of FIG. 4, if the input source or its combination of the video or audio to be viewed and listened to is not present in the history database, in step S408, displaying is carried out in the present screen and audio patterns. Here, as in the foregoing case, the user selects one among a plurality of present patterns.

In step S409, verification is performed for the showing state. If OK, viewing and listening are carried out in this state, and the history database is updated. If NG, the screen and audio patterns are changed by the user in step S410. This processing is similar to that of step S405. On the other hand, if OK, viewing and listening are carried out in this pattern, and the history database is updated. If NG continues three times or more, in step S412, displaying is carried out forcibly in a given preset pattern.

Thus, the viewing and listening state is selected and determined in a given screen layout and audio pattern as described above, in any case, after the verification as to the viewing and listening in the pattern for predetermined time, the history database is updated.

The case has been described, where the screen and audio patterns are determined when one or more input sources are selected from the beginning. However, a case may occur, where an interrupt display request (event) is made from E-mail or the scheduler (timer) during the viewing and listening of a given input source. In addition, an information display request may be made from a new input source by the user operation. Even in such a case, the process returns to step S401 at a point of time when the interrupt even occurs, and similar processing is carried out.

That is, in first step S401, regarding a relationship between the input source of the video or audio being viewed and listened to, and the input source of the event occurring in an interrupting manner, verification is made as to its presence in the history database as in the foregoing manner, and processing is carried out in a similar flow thereafter. If the interrupt event occurs, as a parameter of the history database for determining a viewing and listening pattern, the time passage of viewing and listening may be newly added, and this point will be described later.

FIG. 12 shows an example of the history database, indicating in what screen layout and on what audio mode a given user viewed and listened to the attribute of the input source and information from the input source. Here, regarding eight viewing and listening patterns A B, C, D, E, F, G and H, a screen layout and an audio mode most often viewed and listened to in the past are picked up and set in a table.

Now, if genre information is contained in the attribute data of the input source as in the case of the TV broadcasting system or the data reproducing system from the external medium, the combination of the medium and the genre is set as the attribute of the input source, and then set as a parameter in the attribute database. In the case of the Internet, the combination of the medium and an application is set as the attribute of the input source, and then set as a parameter in the database. In other words, by setting not only the medium but also the combination of more subdivided attributes as the attribute of the input source, the content of information from the input source is reflected, enabling the history of a viewing and listening pattern to be more accurately managed.

In addition, regarding the formation of histogram of past viewing and listening history for each user, and the setting of a screen (window) size to crease the database, the operation of rounding data somewhat close to each other, treating the data as the same history, and extracting the combination of a screen and audio most often used therefrom is constantly carried out as the background processing of the CPU 123.

Figure 13:
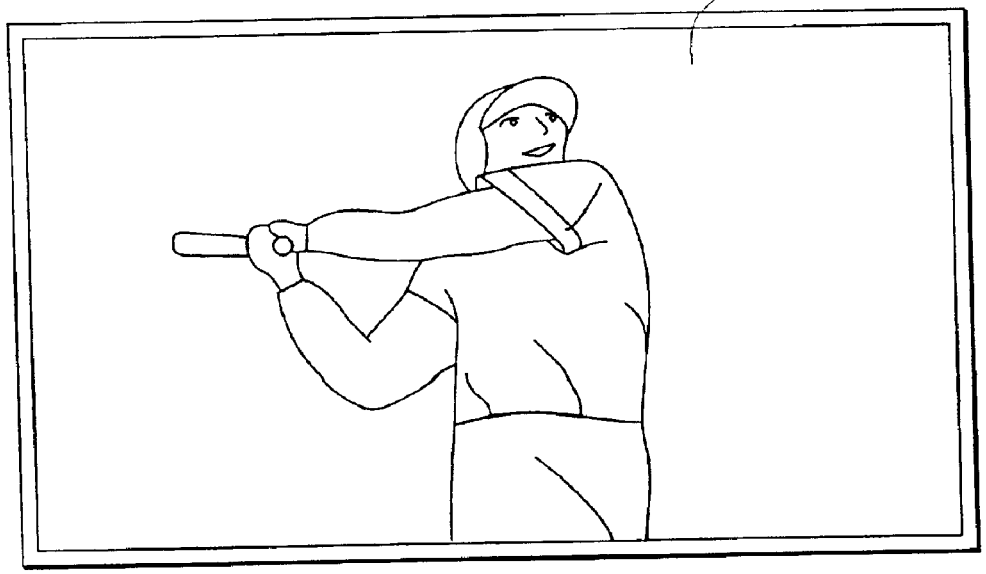
FIG. 13 is a view showing an example of a screen payout in one viewing and listening pattern.

Next, description will be made of how some viewing and listening patterns are processed on the past viewing and listening history by way of some examples. FIG. 13 shows a display example, where as the screen layout of the viewing and listening pattern A shown in FIG. 12, an input source is one, i.e., "DIGITAL TV BROADCASTING", and a genre is "SPORTS". According to the history database of FIG. 12, in the case of this input source, the user most often viewed and listened the program in a wide full screen display as a screen layout, and on a stereo mode from the main speaker as audio. Thus, the data processing apparatus performs control so as to preferentially show a sports program in a pattern shown in FIG. 13 when the user selects the sports program from the digital TV broadcasting (step S403 in FIG. 4).

Figure 14:
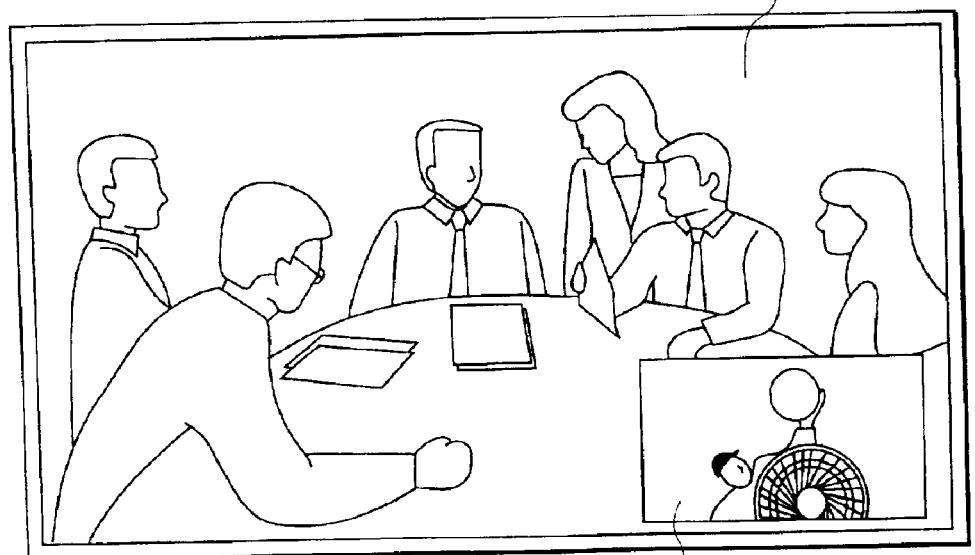
FIG. 14 is a view showing an example of a screen layout in another viewing and listening pattern.

FIG. 14 shows a screen layout in the case of the viewing and listening pattern B shown in FIG. 12. This is an example, where there are two input sources "DIGITAL TV BROADCASTING": one is a drama, and the other is sports. In the past, the user most often opened a slave screen on the right lower side of the screen to verify a progress in the sports while displaying the drama on full screen when the user viewed and listened to the drama and sports programs simultaneously. Thus, the programs are preferentially shown in a screen layout like that shown in FIG. 14.

Figure 15:
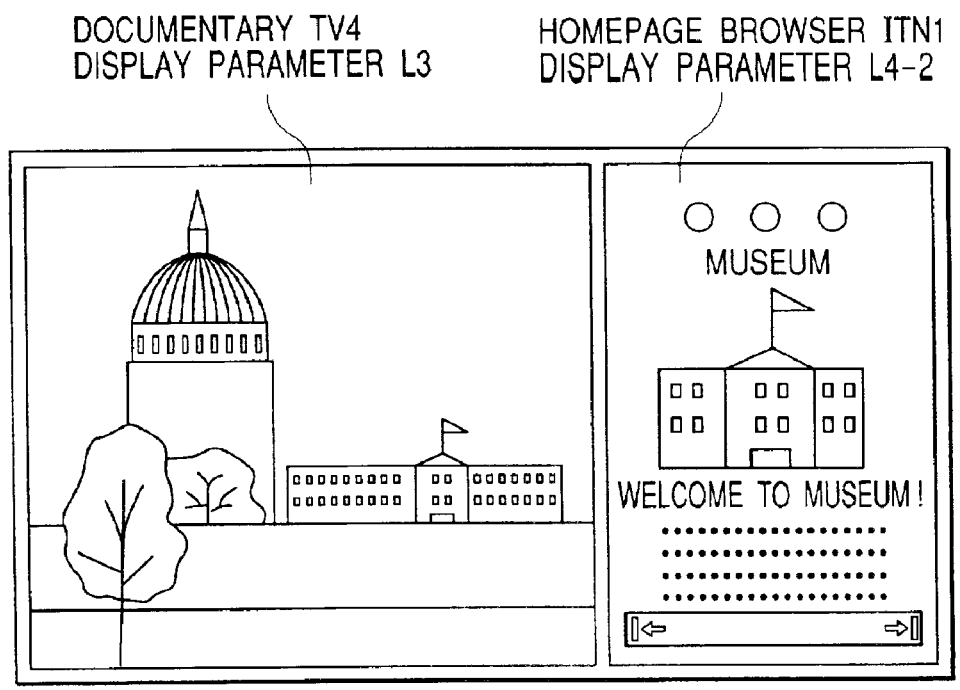
FIG. 15 is a view showing an example of a screen layout in yet another viewing and listening pattern.

FIG. 15 shows a screen layout in the case of the viewing and listening pattern C shown in FIG. 12. This is a scene, where during the viewing and listening of a documentary program in TV broadcasting, the browser is started to investigate program related data, and homepage information regarding the program is checked. In such a situation, in the past, this user often viewed and listened to the program in a state where the TV screen was displayed at left ⅔, and the homepage (browser) at right ⅓. Accordingly, displaying is carried out in a screen layout like that shown in FIG. 20.

Next, description will be made of the operation of the data processing apparatus when an information display request (event) from another input source is made during the viewing and listening of a given input source. Each of FIGS. 16A and 16B, and FIGS. 17A, 17B and 17C shows a showing example when there is an E-mail arrival during the viewing and listening of information from a given input source (viewing and listening patterns D and E in FIG. 12).

Figure 16A:
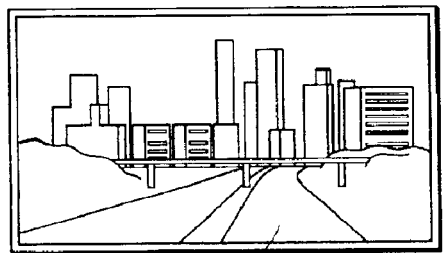
FIGS. 16A and 16B are views, each showing an example of a screen layout in a case where an arrival of E-mail occurs during viewing and listening to a film on a full screen.
Figure 16B:
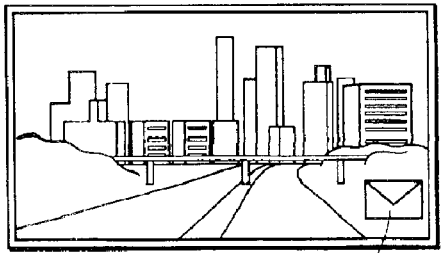

Each of FIGS. 16A and 16B shows the display example of a screen when there is an E-mail arrival during the viewing and listening of a film from the DVD device connected to the data processing apparatus through the IEEE 1394 interface on a full screen. In this case, as shown by the history database of FIG. 12, the user selected an icon display (see FIG. 16B) on the right lower side of the screen as a screen layout at the time of an E-mail arrival, because of a wish not to be interfered with viewing and listening for a film scenario. Thus, the data processing apparatus performs automatic control so as to select and show a display as a first display state in the history database like that shown in each of FIGS. 16A and 16B. If the combination of input source attributes of "MEDIUM=1394 CONNECTION DEVICE AND GENRE=FILM", is not present in the history database, then a preset layout like that described above is shown.

Figure 17A:
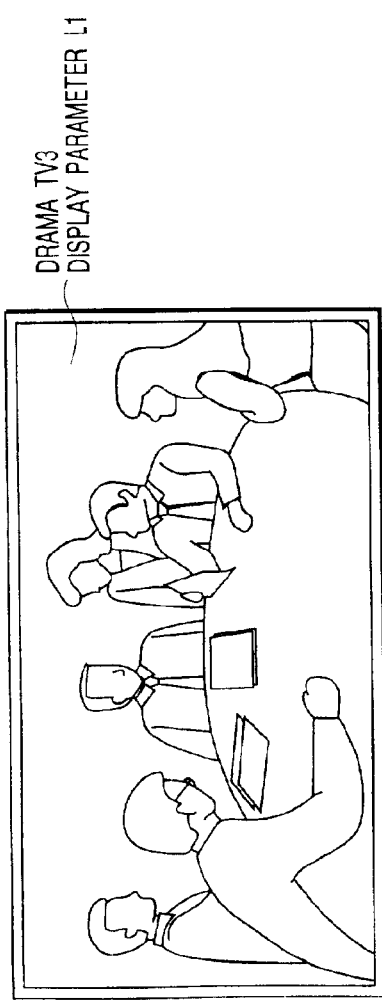
FIGS. 17A, 17B and 17C are views, each showing an example of a screen layout in a case where an arrival of E-mail occurs during viewing and listening to another input source.
Figure 17C:
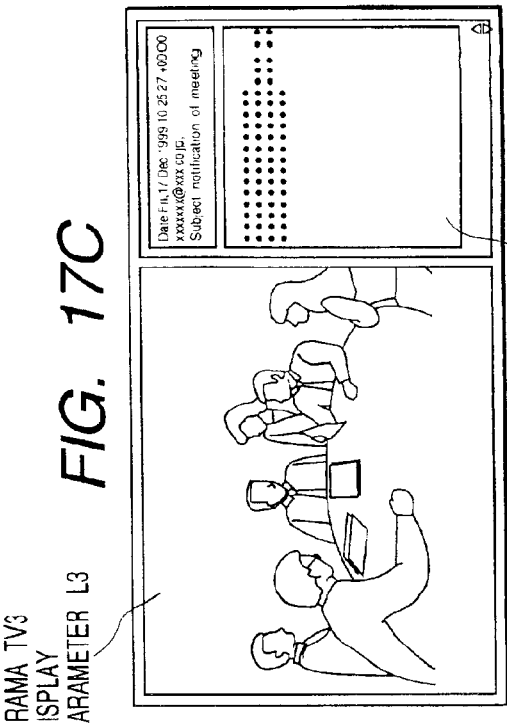
Figure 17B:
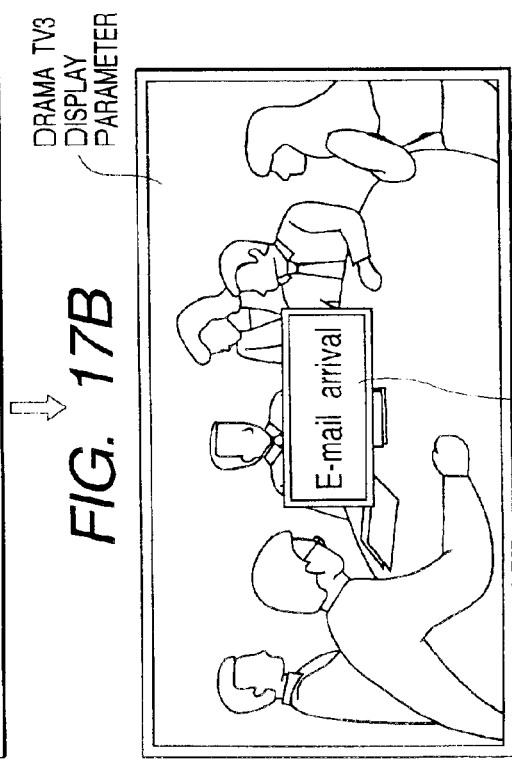
Figure 20:
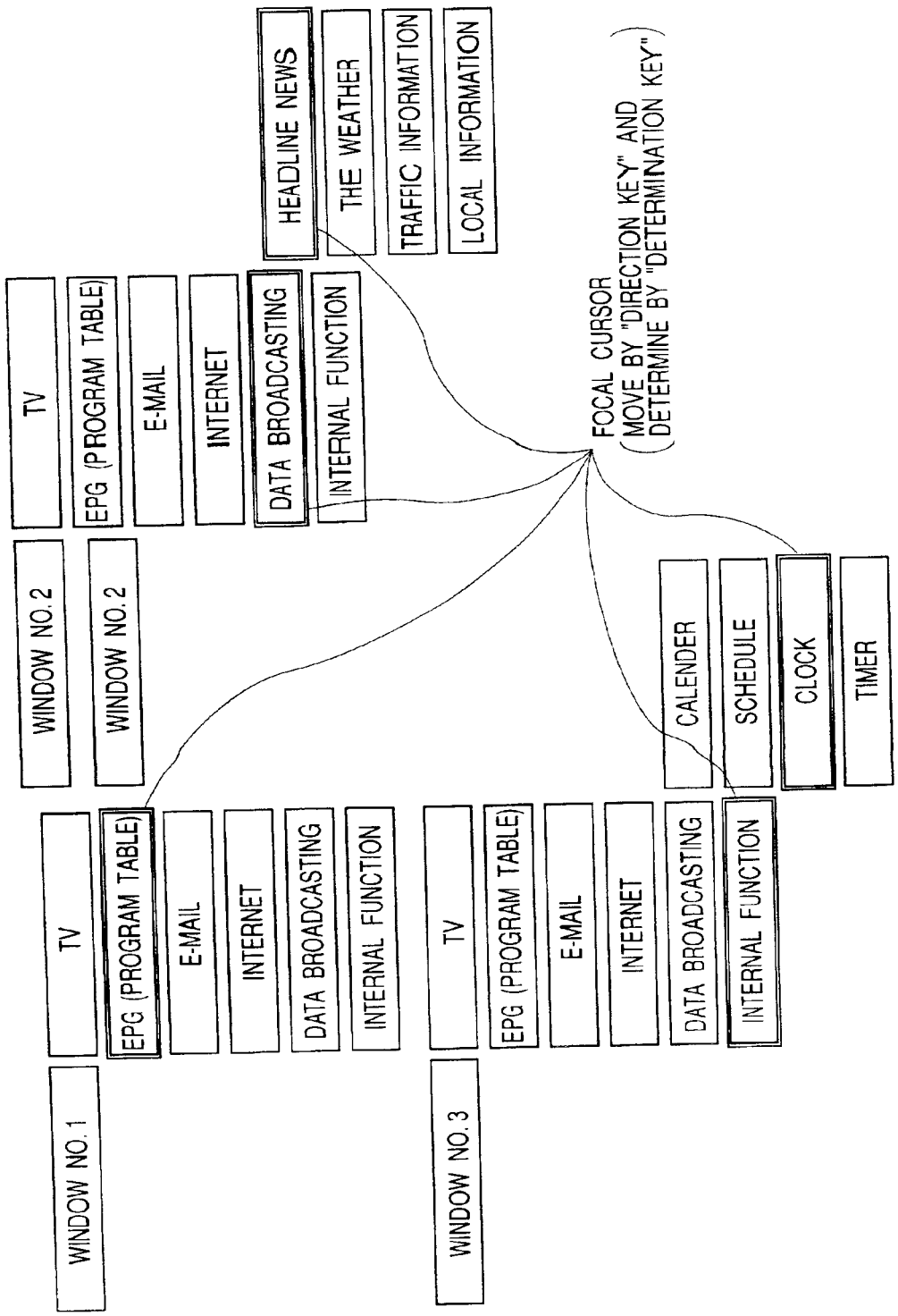
FIG. 20 is a view showing an example of an operation guide display when an input source, a screen and audio are changed.

As in the case of FIGS. 16A and 16B, each of FIGS. 17A, 17B and 17C shows a case, where E-mail arrives during the viewing and listening of a given input source. Here, the attribute of the input source being viewed and listened to before the occurrence of an event is different, and mail arrives during the viewing and listening of a drama on a full screen in each of FIGS. 17A, 17B and 17C. In this case, there are no icon displays different from the case of film viewing and listening. As shown in FIG. 17B, a notification window is displayed, indicating the arrival of E-mail on the uppermost layer of screen center and, 3 seconds layer, as shown in FIG. 17C, control is performed so as to automatically start a main application and open a window by a ⅓ size on the right side of the screen.

The foregoing is a result based on the history where the user treated the interrupt display event more generously for the drama than the film. From the window size and position of this mail application, and the display of the E-mail arrival notification window, a transfer timing and others until the start of the mail application are determined based on the past history pattern of the user. Apparently, even in the interrupt display event like that in the operation flow of FIG. 4, manual setting is made by the user and, by storing this, preferred setting can be achieved when necessary.

In addition, regarding such an interrupt display event, depending on not only a static relationship between the input source viewed and listened to before the event occurrence and the input source request for displaying but also the passage of viewing and listening time of information from the input source viewed and listened to before the even occurrence, even in the case of the combination of similar input sources, the selection of a display state, i.e., icon displaying, popping-up of the window or the like, may vary.

For example, when considerable viewing and listening time passes, and the program nears a film climax scene or the end of a sports game, it can be expected that automatic window popping-up will generally be shunned. In the embodiment, as the parameters of the history database, the attributes of the input source, i.e., the medium and the genre or the medium and the application are combined. However, one parameter may be set including the passage of viewing and listening time. In such a case, it is possible to show a screen layout based on the passage of viewing and listening time at the time of the interrupt event occurrence. In other words, even in the case of similar input sources, a different viewing and listening pattern is selected by a timing for the interrupt display event occurrence.

The counting of the passage of viewing and listening time may use a clock function such as a counter or the like provided in the data processing apparatus, alternatively calculated by detecting information regarding a program obtained from the Internet or the CD-ROM, detecting the start or end time of the viewed and listened program from the data, and comparing it with current time.

Each of FIGS. 18A, 18B, 18C and 18D shows the example of a morning viewing and listening pattern for a given user, specifically showing a change in a showing state from single screen viewing and listening to viewing and listening patterns F, G and H of FIGS. 17A, 17B and 17C.

In FIG. 18A, when the user operates the remote controller to instruct headline news DATA 1 and clock display T1 to be executed on a multi-window display by data transmission during the viewing and listening of a new program TV1 on a full screen, a change is automatically made to the showing state of FIG. 18B (viewing and listening pattern F).

Apparently, as in the foregoing case, the above operation is performed to judge the combination of input sources by the data processing apparatus, detect the past viewing and listening of the user in the screen layout, and automatically manage and show the layout.

In addition, when the user makes an additional display request of the weather forecast data of the data transmission, a change is made to a screen layout shown in FIG. 18C (viewing and listening pattern G). In this case, the display area of the headline news DATA 1 by the data transmission is reduced (L10 to L12), and a weather forecast window is newly opened below it (L14).

Furthermore, the clock display T1 displayed on the right lower side of the conventional screen has been changed to the showing state of being superposed in the window of the headline news (L11 to L13). Lastly, when the operates the remote controller to select and determine a weather mark in order to obtain more specific information regarding weather forecast, a change is made to a screen layout shown in FIG. 18D. In FIG. 18D, a more specific information subwindow regarding weather forecast DATA 2 is opened in the lower part of the window the news TV1.

With reference to FIGS. 18A, 18B, 18C and 18D, the description was made of the gradual increase of the input sources to be displayed. However, if the user selects a plurality of input sources from the beginning, it is apparently possible to transfer to the viewing and listening pattern of FIG. 18D at a stretch.

The data processing apparatus for controlling the screen layout and the audio mode based on the user viewing and listening history has been described mainly with reference to the history database of FIG. 12, the operation flow of FIG. 4, and the screen examples of FIGS. 13 to each of FIGS. 18A, 18B, 18C and 18D. In the embodiment (FIG. 1), the data processing apparatus of the invention includes no display units or broadcast receiving units. However, the invention is not limited to the embodiment from the essence thereof, and similar advantages are apparently obtained even when the invention is applied to an integrated receiver decoder having a broadcast receiving unit but no display units, a television broadcast receiver having a broadcast receiving unit and a display unit, and so on.

Second Embodiment

Next, description will be made of the operation of an integrated receiving system, to which a data processing apparatus according to the second embodiment of the invention is applied. One of the features of the embodiment is that the history of a viewing and listening pattern is managed for each viewing and listening time zone.

The operation flow of creating a viewing and listening pattern history database in the embodiment is nearly similar to that of the operation of creating the viewing and listening pattern history database of the first embodiment shown in FIG. 3. The operations of steps S301, S302, S303 and S304 are completely similar, and thus description thereof will be omitted. However, regarding the operation of step S305 of the first embodiment, the operation will be described as it is different. In other words, the generation step of the history database of the embodiment will be described. In the generation step of the history database, the attribute data of the input source detected in step S302, and the parameter data of the display and the audio detected in steps S301 and S304 are rearranged and, for each viewing and listening time zone (date, and day of the week), history database showing the past viewing and listening of information, i.e., information from which input source, in what screen layout and on what audio mode.

Here, in the history database, several viewing and listening pattern data are left as history for each identical time zone. Input sources, and display and audio parameters in respective cases are detected, sorted and stored in order of high frequency. For counting of viewing and listening time, basically a clock function provided in the data processing apparatus is used. Each time, time (date) information superposed on a broadcast wave is detected, and time is corrected. In addition, among display parameters, a window start address, an X direction size, and a Y direction size can take any given values on the screen, and thus these are not shown. In the case of near address and size, however, data is rounded, and ones within a given range are stored as similar data (value).

Thus, a viewing and listening pattern indicating which input source was viewed and listened to in what screen layout and on what audio mode is stored in the history database for each time zone, each date and each day of the week.

Next, description will be made of the operation flow of determining a screen layout and an audio output mode during medium viewing and listening. This operation is also nearly similar to that in the flowchart of the first embodiment shown in FIG. 4, and thus description of similar portions will be omitted. In the embodiment, first, a medium instructed to be viewed and listened to by the user, i.e., an input source, is discriminated, and current time (date, and day of the week) is also identified. Then, in next step, based on the identified time information, checking is made as to whether the past viewing and listening history of its time zone is present or not in the history database. The operation thereafter is similar to steps S402 to S420 shown in FIG. 4. However, when the history database is updated in step S420, a relationship between the combination of input sources and the screen layout/audio output is updated for each viewing and listening time zone.

FIG. 21 shows an example of a history database indicating which input source was viewed and listened to by a given user in what screen layout and on what audio mode for each time zone (time, day of the week and date). Here, to facilitate understanding, specific numerals, the day of the week, a month, and so on, are used for the data of the time zone. In actuality, however, such data are allocated as certain codes. Apparently, to generate the database, the operation of forming a histogram of past viewing and listening history data for each user, sorting the data for each time, day of the week and date, and extracting the combination of most often used input source, screen and audio is constantly carried out as the background processing of the CPU 123.

Regarding a screen (window) size and others, which can take any optional values, rounding is carried out. For data near each other somewhat, the data are treated as identical data. Accordingly, the increase of combinations more than necessary is prevented. In addition, by setting in the device side, it is possible to limit, to certain extent, the range (window size and position) of selection to be made by the user.

Figure 22:
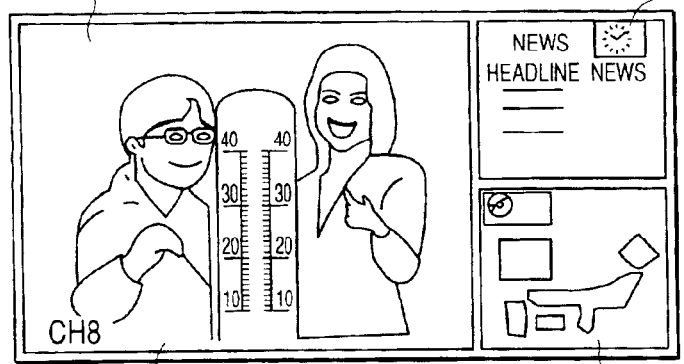
FIG. 22 is a view showing an example of a screen layout in one viewing and listening pattern.

Next, description will be made of specific processing carried out based on the past viewing and listening history by way of some examples. FIG. 22 shows a screen layout in the case of a viewing and listening pattern A shown in FIG. 21. The viewing and listening pattern A indicates a combination (input source, screen layout and audio mode) most often viewed and listened to from 6 a.m. to 7 a.m. of a weekday for a given user. A day and month section is blank, which indicates that this combination is most often used all through the year irrespective of a month (season) or a date.

In FIG. 22, the showing state of obtaining much information is shown, reflecting a time zone, which is a morning of a weekday. While viewing and listening the morning program of Ch 8 of TV broadcasting on a largest screen L1, two slave screens are opened on the right side of the screen to show the contents of news (DATA 1) and weather forecast (DATA 2) by data transmission. Here, these three windows are disposed without being overlapped on each other, and this layout information is naturally recorded in the history database. Further, in the state of being superposed on the window of the news, a clock as one of the internal functions (applications) of the data processing apparatus is displayed on right upper side. For an audio output destination, the audio of TV broadcasting (TV 1) is outputted to the main speaker, and the audio information of the news (DATA 1) by data transmission is outputted to the headphone.

This user most often viewed and listened to the four kinds of input sources simultaneously in the screen layout and on the audio mode of FIG. 13 at the same time (day of the week). Thus, the data processing apparatus checks time information each time immediately after turning ON power or during the power ON of receiver, and shows the program preferentially by the combination of the input source, the screen layout and the audio mode if there is viewing and listening history data for the time (time zone).

Figure 23:
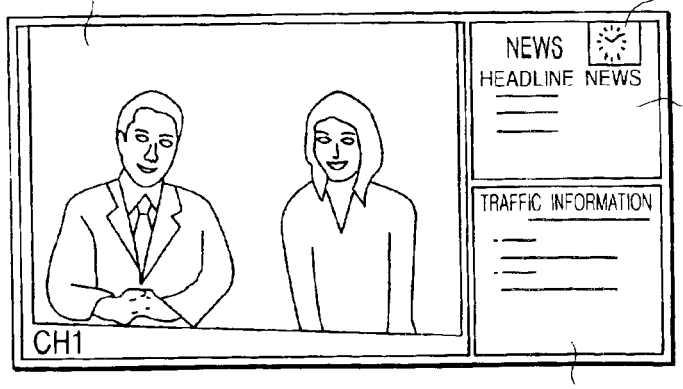
FIG. 23 is a view showing an example of a screen layout in a viewing and listening pattern, to which transfer was made from the above viewing and listening pattern after a passage of time.
Figure 29:
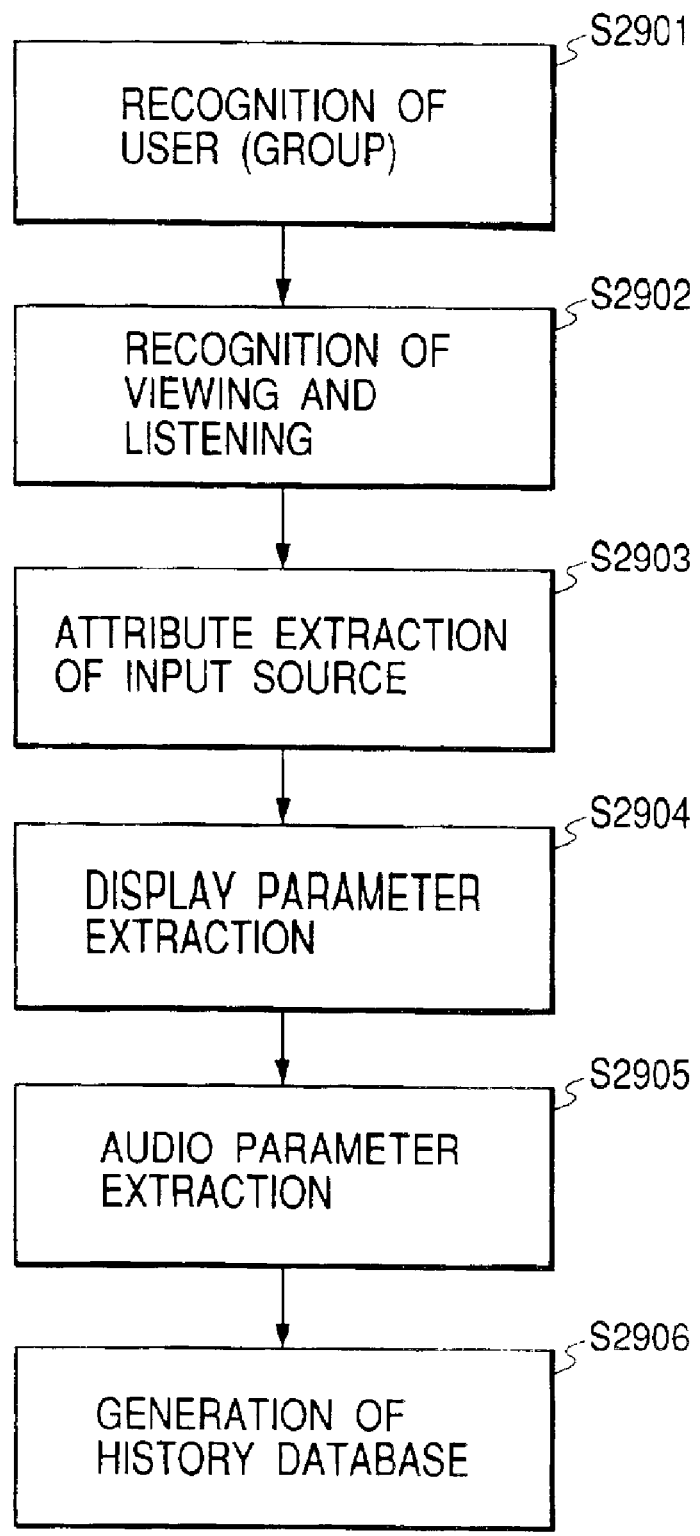
FIG. 29 is a flowchart showing a procedure for creating a viewing and listening pattern history database.

FIG. 23 shows a screen layout in the case of a viewing and listening pattern (viewing and listening pattern B) when the state of FIG. 29 on the same weekday to 7 a.m. When the same time was reached, normally, this user customarily performed the operations of changing the channel of the TV broadcasting to Ch 1, and the window displaying the weather forecast around 6 a.m. to traffic information (DATA 3). Accordingly, upon detection of the reaching of the same time, the data processing apparatus performs control to make automatic change to a viewing and listening pattern shown in FIG. 23 without troubling the user based on the past viewing and listening history data. Before the automatic change control, support may be provided to display warning for predetermined time, and inhibit the change of the viewing and listening pattern during the warning display.

Figure 24:
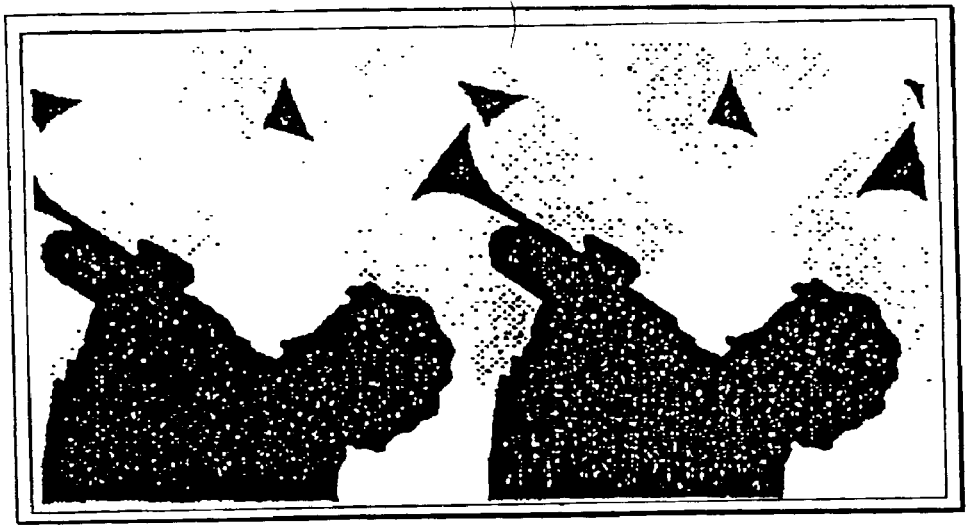
FIG. 24 is a view showing an example of a screen layout in another viewing and listening pattern.

FIG. 24 shows an example of the screen of a viewing and listening pattern C shown in FIG. 21. This is a showing example when a variety program (TV 3) always watched during noon (from 12 to 12:30) on Sunday is present. Also in this case, channel changing, the setting of a screen (L5) and the audio mode (M1), and so on, in the case of TV broadcasting, are automatically controlled based on the past history data.

Figure 25:
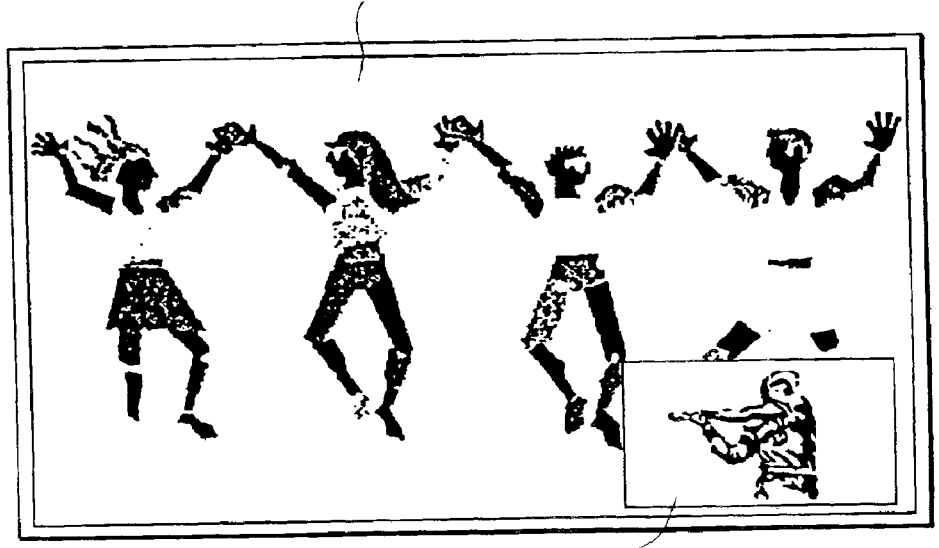
FIG. 25 is a view showing an example of a screen layout in yet another viewing and listening pattern.

FIG. 25 shows an example of the screen of a viewing and listening pattern E shown in FIG. 21. This is a viewing and listening pattern most often used especially from April to September, and a case where a professional baseball night game broadcast on a sports channel is watched on a picture-in-picture (PinP) screen while an always watched variety program is watched from 8 p.m. to 9 p.m. on Wednesday. In such a case, in addition to the above-described parameters (FIGS. 22, 23 and 24) of "time" and "day of the week", "date" is judged and, if outside the range of this date, no control by history is carried out. In FIG. 21, the example of the history data different by a month unit was shown. Apparently, however, the history data can be managed by a day unit.

Next, description will be made of an operation when a display request of another input source (event) is made during the viewing and listening of a given input source. FIG. 26 shows the screens of viewing and listening patterns F and G of FIG. 21. Here, it is a case where E-mail arrives in an interrupting manner while a film program (TV 5) broadcast from 9 p.m. to 11 p.m. on Tuesday only in this period (from October to December) every year is watched on a wide fill screen (L5) from the main speaker on multi-channel stereo mode (M2).

This user often selected, in the past, the showing state of displaying an icon on the right lower side of the screen as the screen layout at the time of E-mail arrival because of the time zone, and the viewing and listening of a film (wishing not to be interfered with viewing and listening) as shown in FIG. 26. Thus, the data processing apparatus performs automatic control so as to select such a display state as a first showing state, and show a program in a manner like that shown in FIG. 26.

Figure 27:
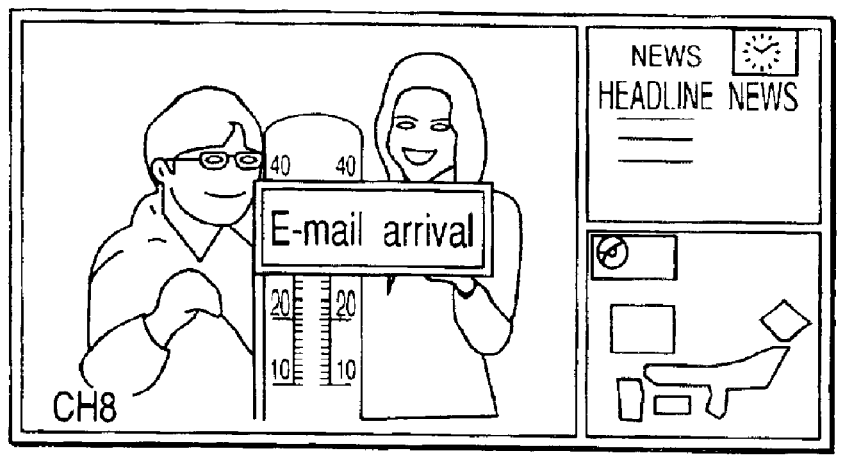
FIG. 27 is a view showing another example of a screen layout when E-mail arrives.

FIG. 27 shows a showing example when E-mail arrival occurs in another time situation, i.e., in the situation (viewing and listening pattern A) of FIG. 21. The viewing and listening pattern A is a morning showing state of a weekday. Because of the possibility of important mail for the user, a showing state is selected to strongly urge verification.

As described above, in the data processing apparatus, according to the time (day of the week, date), the input source, the screen layout, and the audio mode are first shown in the pattern most often viewed and listened to in the past. If the user does not recognize the showing OK, as described above, the user can perform customization by operating the remote controller.

In the embodiment, as in the case of the first embodiment, the data processing apparatus of the invention includes no display units or broadcast receiving units. However, the apparatus is not limited to the embodiment from the essence of the invention and, apparently, similar advantages can be obtained when the invention is applied to an integrated receiver decoder (IRD) having a broadcast receiving unit but no display units, a television broadcast receiver having a broadcast receiving unit and a display unit or the like.

Third Embodiment

Next, description will be made of the third embodiment of the invention with reference to the accompanying drawings. According to the embodiment, one of the features is that when an integrated receiving system is used by a plurality of users (user group), the history of a viewing and listening pattern for each user group is stored and, based on the history data, an optimum viewing and listening pattern is shown.

Figure 28:
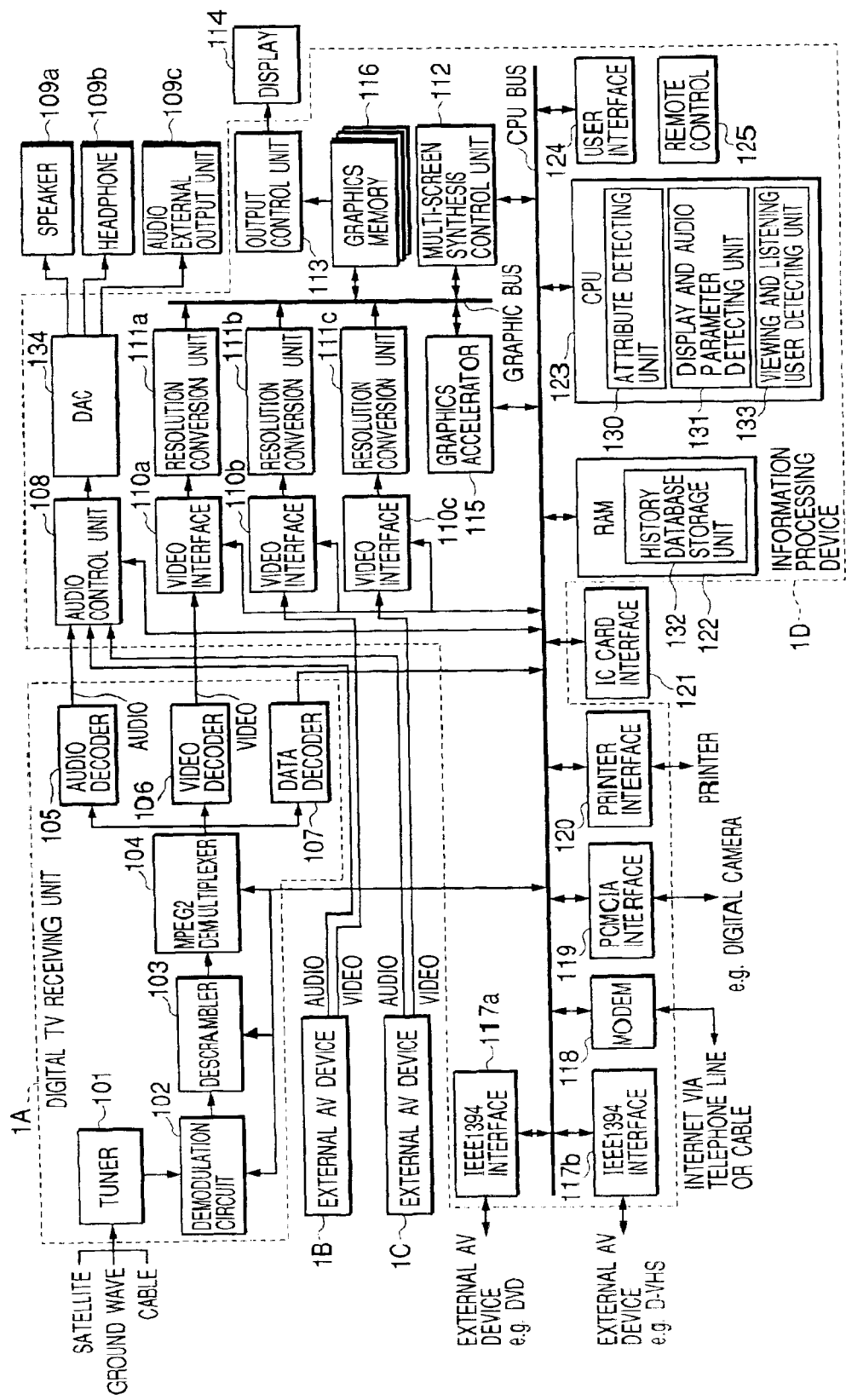
FIG. 28 is a block diagram showing a configuration of an integrated receiving system including a data processing apparatus according to a third embodiment of the invention.

FIG. 28 is a block diagram showing the configuration of the integrated receiving system including a data processing apparatus according to the third embodiment of the invention. In this block diagram, a point different from the first and second embodiments is that the CPU 123 is provided with a viewing and listening user detecting unit. Other components are similar to those of the first and second embodiments, denoted by similar reference numerals, and description thereof will be omitted.

Figure 31:
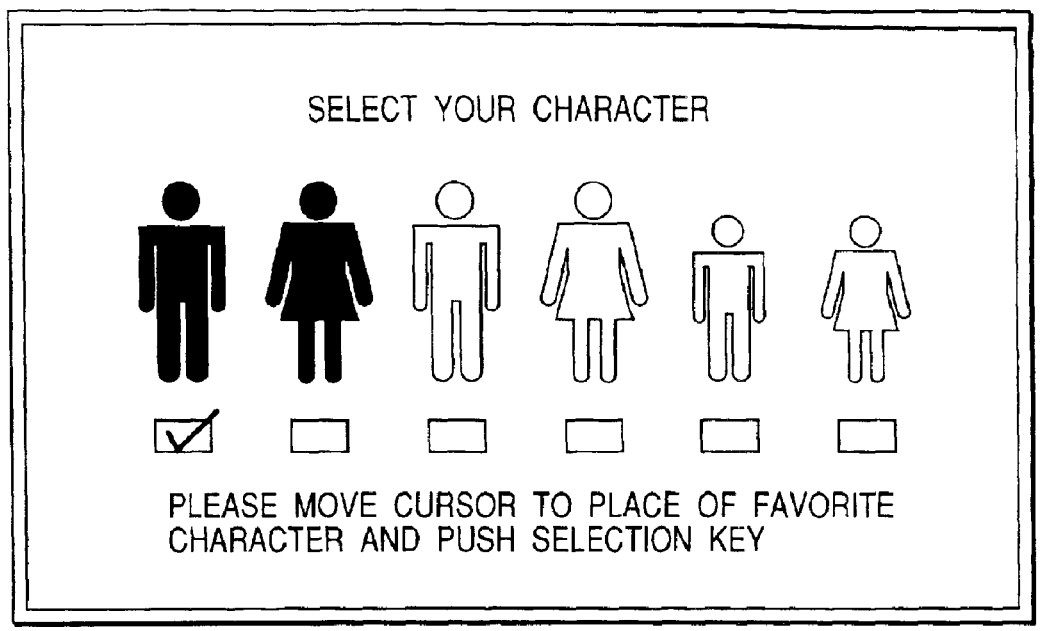
FIG. 31 is a view showing an example of a user ID selection screen displayed on a display.

FIG. 31 shows an example of a user ID selection screen displayed on the display 114. In this screen, the user moves the cursor to the place of a favorite character and selects it by using the remote controller 125, and a character is registered as own ID for each user. For example, ID of each member of a family, such as a character A for a father, a character B for a mother, a character E for a son and a character F for a daughter, is registered in the state of the selected character. In a public place, as the number of target people is large, numerals (member number or the like) are generally entered as user ID. In the embodiment, however, the integrated receiving system for family use is assumed, and thus an easier graphical user interface screen is provided for the user.

Figure 32:
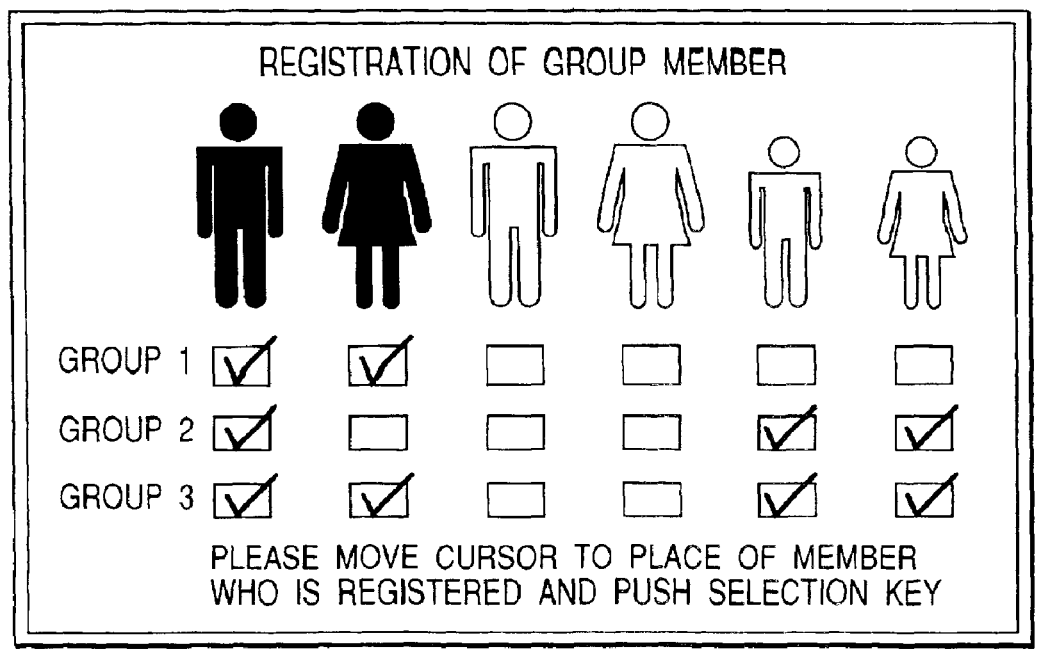
FIG. 32 is a view showing an example of a user group registration screen.

FIG. 32 shows an example of a user group registration screen. Here, by combining the characters as user ID registered in FIG. 31, several user groups can be registered. Also in this case, as in the case of the user character registration time, the registration is completed by operating the remote controller to successively select characters constituting the group to be registered. In FIG. 32, a group 1 indicates father+mother (two, i.e., husband and wife); and a group 3 two, husband and wife+two children (equivalent to all the member of a family).

Next, description will be made of the operation flow of the CPU 123 when a viewing and listening pattern history database is generated in the embodiment. FIG. 29 is a flowchart showing the procedure of generating the viewing and listening pattern history database. This processing is executed by the CPU 123, including the basic steps of identifying a viewing and listening user when a given input source (TV, external DVD, Internet or the like) is viewed and listened to, then detecting the attribute of the input source, detecting in what state (screen layout and audio mode) each input source was viewed and listened to, generating history database correlating such information, and then storing it in the history database storage unit 132 in the RAM 122.

In step S2901 of FIG. 29, the viewing and listening user detecting unit 133 identifies a viewing and listening user. There are various user identifying methods, for example ones of identifying the user by photographing a person in front of the receiver by the camera, and identifying the user from a fingerprint by mounting a fingerprint authentication unit on the remote controller. Here, for the purpose of further assuring a correlation between the viewing and listening user (hereinafter, viewing and listening user includes not only an individual user but also a user group) and the viewing and listening history data, the method of making direct selection by the user is employed. In other words, for predetermined time after power input, or by pushing the user button 212 of the remote controller 125, a viewing and listening user selection icon like that shown in FIG. 33 is displayed near the right of the lower side of the screen.

Figure 33:
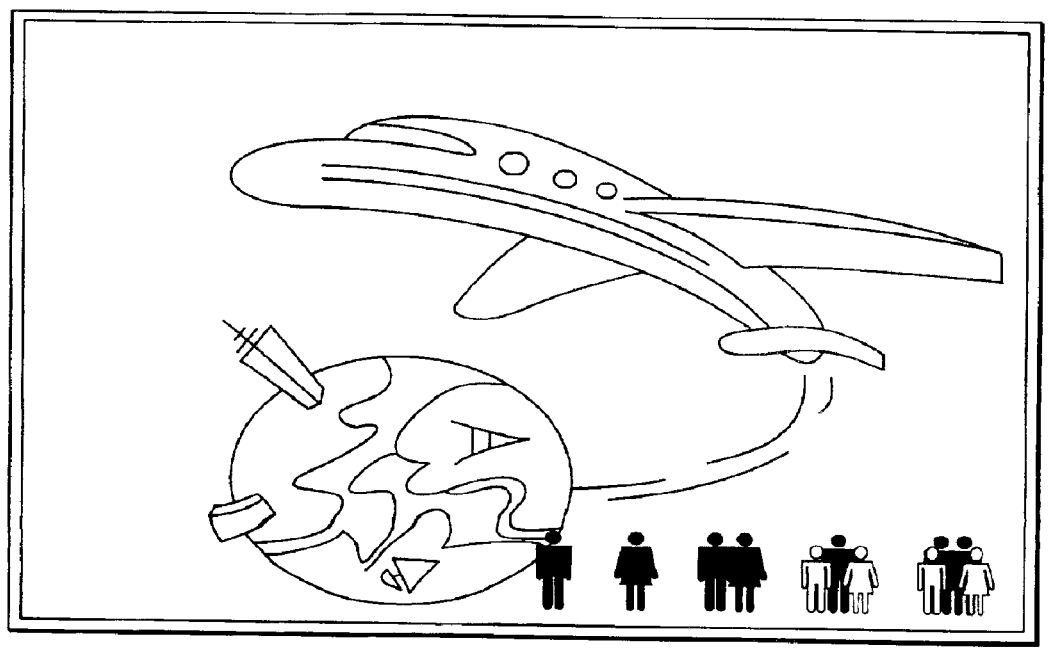
FIG. 33 is a view showing a constitutional example of a viewing and listening user selection screen displayed on the display.

FIG. 33 shows an example of a viewing and listening user selection screen displayed on the display 114. An icon group displayed in this case is one, where the user made user ID character registration and user group registration beforehand. That is, shown from the left end to the right end of the icon group are a single user (father), single user (mother), user group 1 (father+mother), user group 2 (father+two children), and user group 3 (all members of family). Here, when the icon of the viewing and listening user is selected by the remote control operation by the user, the system (CPU 123) recognizes the viewing and listening user.

Though not shown, if no selection operations were carried out by the user, initial setting was made where a general multi-user was recognized. The initial setting of the viewing and listening user at the time of non-selection can be changed from a separate menu screen (e.g., single user (father) setting) according to user preference.

Then, in step S2902, recognition of the viewing and listening of a given input source is carried out. Here, if a given input source (channel in the case of TV) is selected for predetermined time or more, the viewing and listening are recognized. Also for the screen layout, if the screen is fixed in the same layout for predetermined time or more, the viewing and listening of the input source displayed therein are recognized. The same is true for a audio output. This recognition is carried out to prevent the storage of the viewing and listening pattern as history data when a so-called zapping operation is carried out, i.e., a preferred channel is searched by successively changing channels during TV channel selection.

In step S2903, the attribute detecting unit 130 detects the attribute of the input source, the viewing and listening thereof having been recognized in step S2902.

The attribute data regarding the input source are sent in by being multiplexed on a broadcast wave as service attendant information regarding a channel or a program called service description table (SDT) or event information table (EIT) in the digital TV broadcasting system. Thus, the attribute data regarding the input source can be extracted by filtering the table data at the digital TV receiving unit 1A, and processing it at the CPU 123. Regarding the external input source other than the broadcasting system, the CPU 123 detects each parameter in association with each interface input unit. Here, since the attribute data of the input source, a medium kind, a genre classification and an application classification are similar to those of the foregoing embodiment, description thereof will be omitted.

In steps S2904 and S2905, the display parameter of a video displayed on each window, and an audio parameter of audio corresponding to each window are respectively detected by the display and audio parameter detecting unit 131 of the CPU 123. However, its operation is similar to steps S304 and S305 shown in FIG. 3, and thus description thereof will be omitted.

In step S2906, the CPU 123 rearranges a relationship between the attribute data of the input source detected in step S2903, and the display parameter data and the audio parameter data respectively detected in steps S2904 and S2905, and generates a history database indicating in what screen layout (display parameter) and on what audio mode various input sources were viewed and listened to. In other words, for each input source ID, what display parameter and what audio parameter were used for viewing and listening, and its viewing and listing frequency are stored in the history database storage unit 132 of the RAM 122. Further, when a plurality of input sources are simultaneously viewed and listened to, display and audio parameters for each combination pattern of the input source ID are stored in the history database storage unit 132.

Thus, viewing and listening pattern history data indicating which input source was viewed and listened to in what screen layout and on what audio mode for each individual user and each user group, is stored in the history database storage unit 132.

Figure 30:
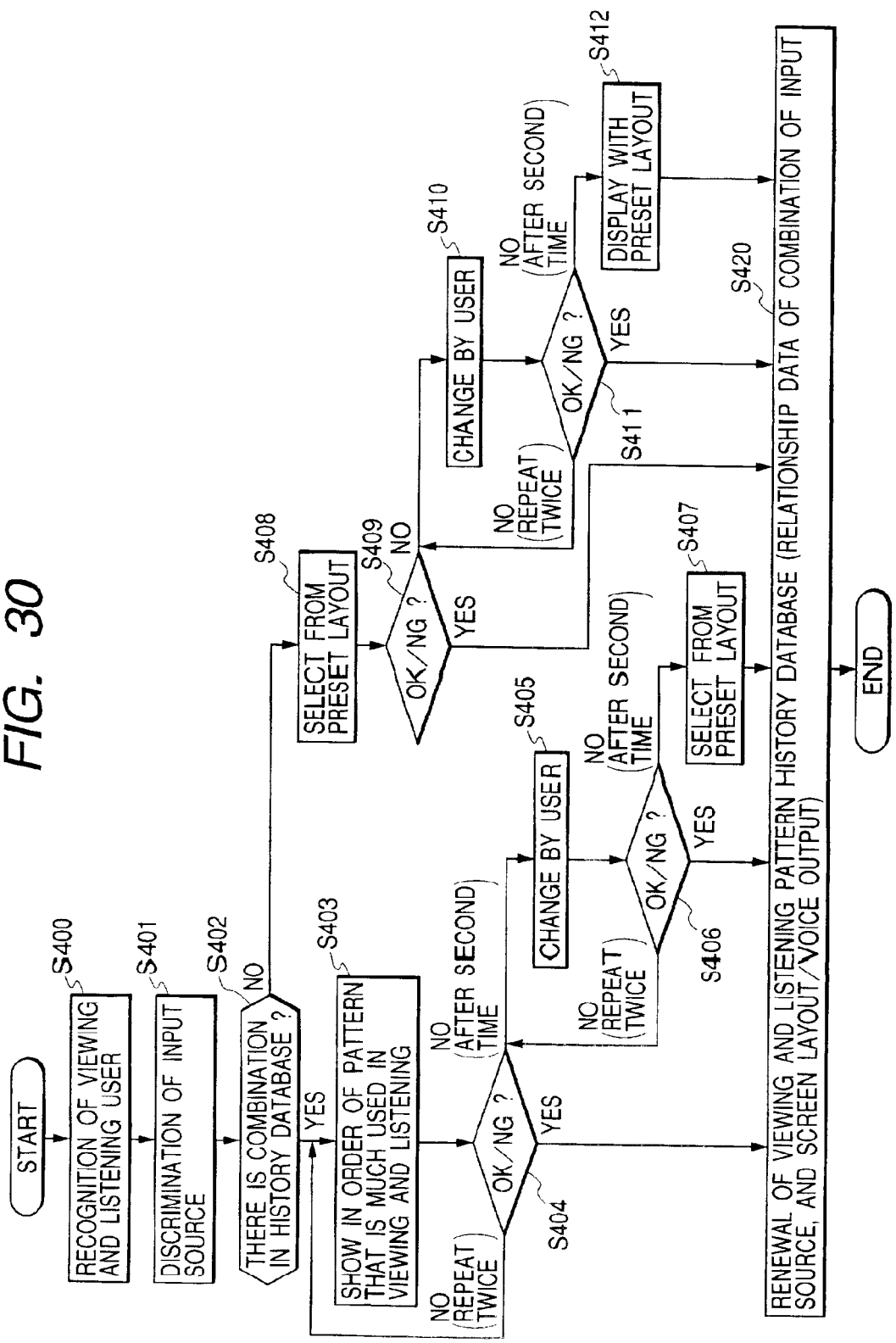
FIG. 30 is a flowchart showing a procedure of a basic operation until a screen layout and an audio mode are determined in a case where a user views and listens to a given input source.

FIG. 30 is a flowchart showing a basic operation procedure until a screen layout and an audio mode are determined when the user views and listens to a given input source. This flowchart is nearly similar to that shown in FIG. 4, and a different point is that viewing and listening user identification is carried out in step S3001.

First, in step S3000, a viewing and listening user is identified. Here, as the case of the operation of step S2901 of FIG. 29, an icon is displayed on the screen to urge the user to make selection. If no input operations are carried out by the user, the viewing and listening by the general multi-user (because if the initial setting of the device, and changeable) is judged.

Then, in step S3001, the input source ID selected by the user for viewing and listening is identified. In this case, there may be a case where only one input source has been selected or a case where a plurality of input sources have been selected from the beginning.

In subsequent step S3002, based on the identified viewing and listening user, and the attribute data of the selected input data, checking is made as to whether the input source (or combination of the plurality of input sources) was viewed and listened to in the past or not, i.e., the input sources are present or not in the viewing and listening pattern history database. If they are present in the history database, based on the past viewing and listening pattern history data thereof, showing is made in a screen layout and on an audio mode in order of highest frequency (S3003), and a query is made to the user as to whether the shown screen layout and audio mode are OK or not (S3004).

Thereafter, the operations of steps S3003 to S3020 are similar to those of steps S403 to S420 shown in FIG. 4, and description thereof will be omitted.

If an interrupt input source (display event) occurs from E-mail or the scheduler (timer) during the viewing and listening of a given input source, the process returns to step S3001 at the time of the occurrence, and thereby such a case can be dealt with. In other words, in step S3001, regarding the input source being viewed and listened to, and the input source occurring in an interrupting manner, as in the foregoing, determination is made as to the combination of such input sources is present or not in the viewing and listening pattern history database, and processing similar to that shown in FIG. 30 is executed thereafter. In the case of the interruptive input source, the passage of viewing and listening time is newly added as a parameter of the viewing and listening history database, and this point will be described later.

FIG. 34 shows a part of the viewing and listening pattern history database.

The viewing and listening history database indicates which input source various users (user group) viewed and listened to in what screen layout and on what audio mode. Here, regarding the viewing and listening pattern of a representative user combination (user group), the screen layout and the audio mode most often used in the past are picked up, and formed on a table. Apparently, to generate the database, the operation of forming a histogram of past viewing and listening history data for each user (user group), executing rounding for the setting of a screen (window) size (data adjacent to each other are treated as identical data), extracting the combination of the screen layout and the audio mode most often used among them, is constantly performed as the background processing of the CPU 123.

The table of FIG. 34 shows a part of the viewing and listening pattern (screen layout and audio mode) most often viewed and listened to for each input source combination. In the back of the table, viewing and listening pattern history data according to the number of viewing and listening times, second, third , , , processed based on the history database of each input source combination is contained.

Next, description will be made of how the screen layout and the audio mode for the viewing and listening by the user or the user group are processed based on the past viewing and listening history by way of specific example.

Figure 35:
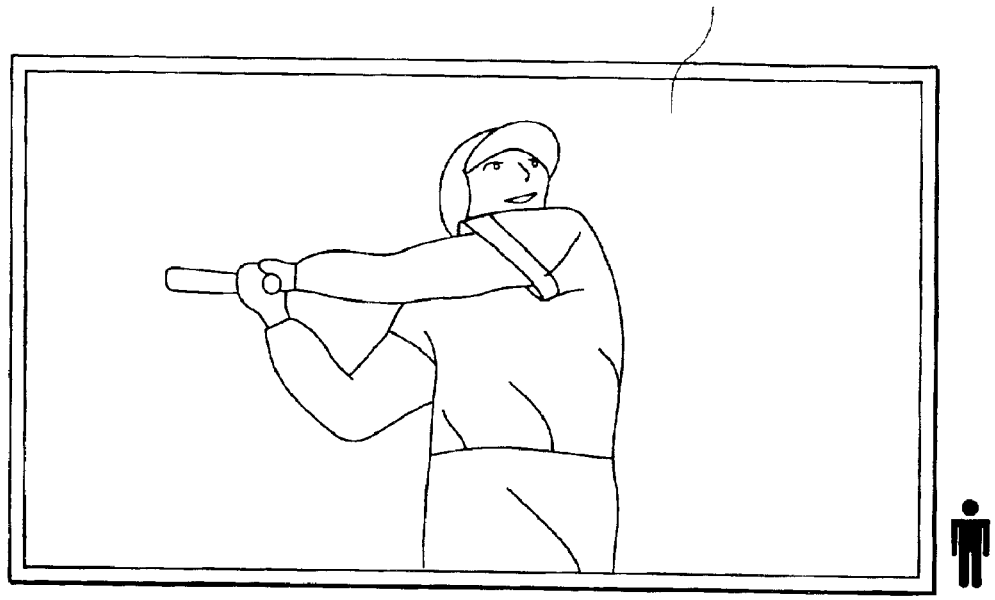
FIG. 35 is a view showing an example of a screen displayed in the case of viewing and listening by a single user (father) shown in a first line (viewing and listening pattern A) of a table of FIG. 34.

FIG. 35 shows an example of a screen displayed in the case of viewing and listening by a single user (father) shown in the 1st line (viewing and listening pattern A) of the table of FIG. 34.

The number of input sources is one, i.e., "DIGITAL TV BROADSCATING", and a genre is "SPORTS". According to the table of FIG. 34, in the case of this input source, this user (father) most often viewed and listened to the program in a wide full screen display as a screen layout and on a stereo mode from the main speaker as audio. Thus, the multi-window display controller performs control so as to preferentially show the program in the pattern thereof when the user selects the input source (digital TV broadcast sports) (step S2903 of FIG. 29).

Figure 36:
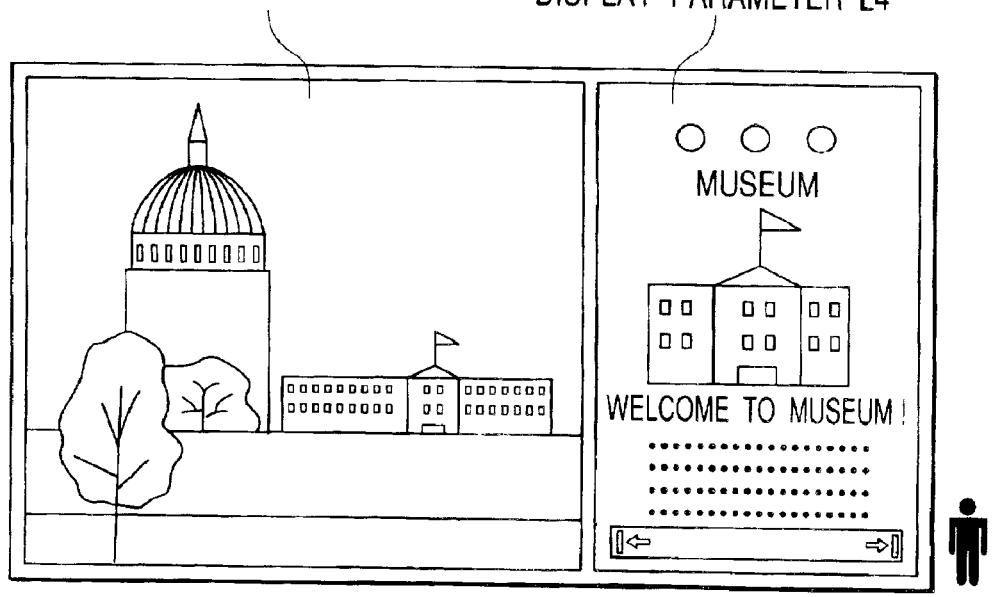
FIG. 36 is a view showing an example of a screen displayed in the case of viewing and listening by a single user (father) shown in a third line (viewing and listening pattern C) of the table of FIG. 34.

FIG. 36 show an example of a screen displayed in the case of viewing and listening by a single user (father) shown in the third line (viewing and listening pattern C) of the table of FIG. 34.

This is a screen layout when the browser is started to investigate program related data, and program related homepage information is checked during the viewing and listening of a documentary program by digital TV broadcasting. In such a case, in the past, the user most often viewed and listened to the program in the state of displaying TV screen at left ⅔ and the homepage (browser) at right ⅓, and thus displaying is carried in a state like that shown in FIG. 36.

Figure 37:
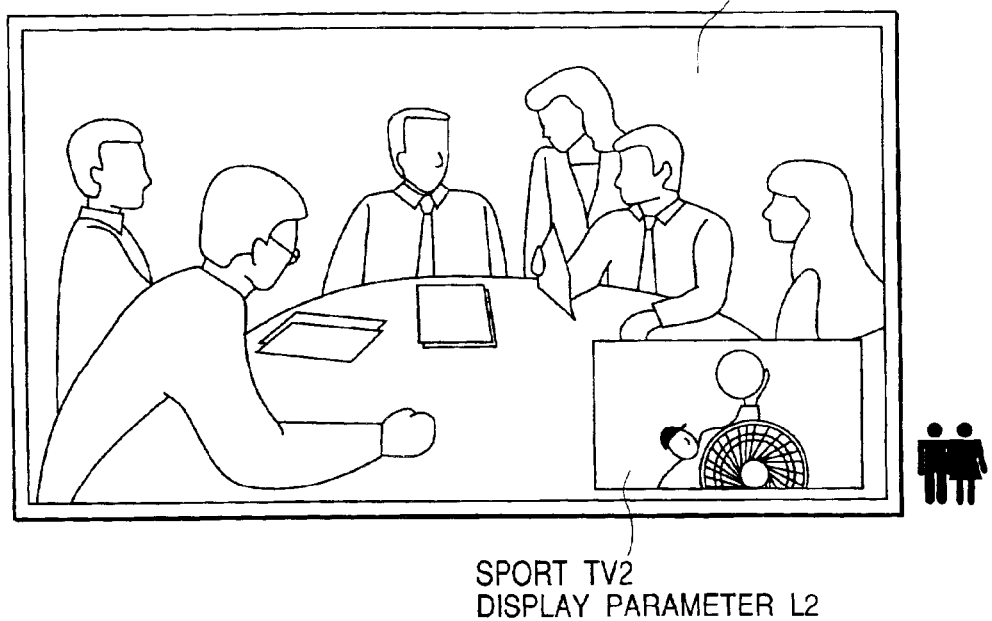
FIG. 37 is a view showing an example of a screen displayed in the case of viewing and listening by a user group 1 (father and mother) shown in a second line (viewing and listening pattern B) of the table of FIG. 34.

FIG. 37 shows an example of a screen displayed in the case of viewing and listening by a user group 1 (father+mother) shown in the second line (viewing and listening pattern B) of the table of FIG. 34.

This is a case where the number of input sources is two, i.e., "DIGITAL TV BROADCASTING", one thereof is a drama, and the other is sports. When simultaneously viewing and listening the drama and the sports program in the past, the user group 1 most often used the viewing and listening pattern of opening a slave screen in the right lower side of the screen, and verifying the progress in the sports game. Thus, showing is preferentially carried out in a screen layout like that shown in FIG. 37.

Figure 38:
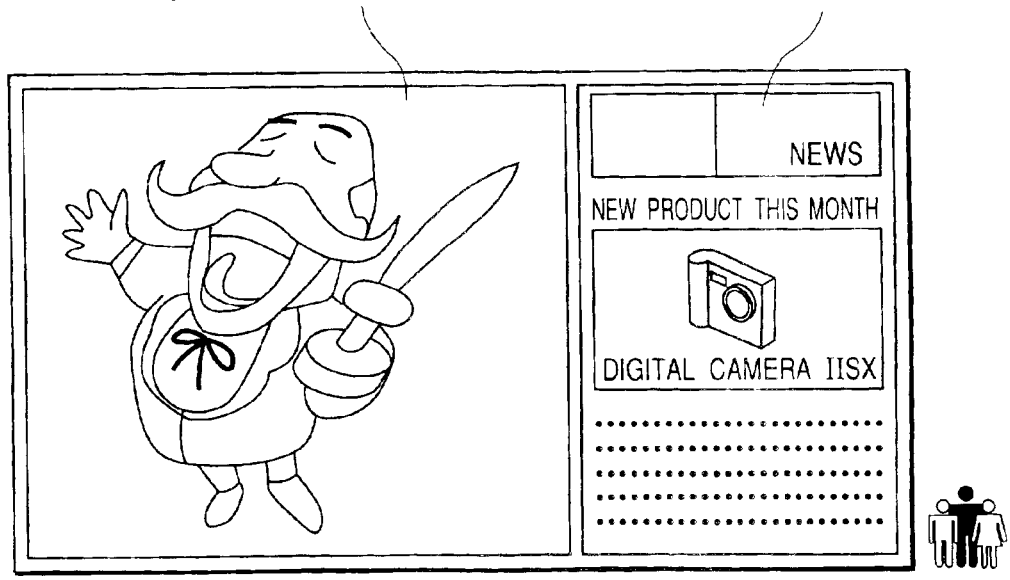
FIG. 38 is a view showing an example of a screen displayed in the case of viewing and listening by a user group 2 (father and two children) shown in a fourth line (viewing and listening pattern D) of the table of FIG. 34.

FIG. 38 shows an example of a screen displayed in the case of viewing and listening by a user group 2 (father+two children) shown in the 4th line (viewing and listening pattern D) of the table of FIG. 34.

This is a screen layout in a case where the father viewed and listened to a news program while the two children view and listened to animation by TV broadcasting. In such a case, when the animation+data transmission was selected as an input source combination, in the past, the user group 2 most often viewed and listened to the programs in the state of displaying the animation screen at left ⅔ and the data transmission at right ⅓. Thus, displaying is carried out in a screen layout like that shown in FIG. 38.

In the data processing apparatus of the embodiment, the foregoing cases and similarly cases described below are characterized in that showing is carried out first in the viewing and listening pattern most often used in the past as the screen layout and the audio mode. If the user does not recognize the viewing and listening pattern OK, as described above, by operating the remote controller, the second, third viewing and listening patterns can be successively selected as long as history data is present. In other words, if "NO" in step S2904 of FIG. 29, the process returns to step S2903 twice more, executes showing according to the viewing and listening patterns having second and third highest viewing and listening frequencies. Here, if a plurality of viewing and listening pattern are not present as history data, and the shown screen layout and audio mode are not liked, the process proceeds to customization by the user in step S2905.

As in the determination operation of the foregoing viewing and listening pattern, the operation when a display request (event) for another input source occurs during the viewing and listening of a given input source is nearly similar to that of each of the first and second embodiments, and thus description thereof will be omitted. However, the embodiment is different from the foregoing embodiments in that viewing and listening user identification is carried out at the start of the operation and, based on the history data according to the viewing listening user, the showing state of a video and audio is determined.

As described above, in the data processing apparatus of the embodiment, the viewing and listening user/user group is recognized, the screen layout and the audio mode are determined based on the past viewing and listening history of the user/user group, the screen is accordingly displayed, and the audio is outputted.

In the embodiment, as in the cases of the first and second embodiments, the data processing apparatus of the invention includes no display units or broadcast receiving units. However, the configuration is not limited to the embodiment from the essence of the invention and, apparently, a similar advantage is obtained even when the invention is applied to an integrated receiver decoder (IRD) having a broadcast receiving unit but no display units, a television broadcast receiver having a broadcast receiving unit and a display unit, or the like.

Needless to say, the invention can be achieved by supplying a storage medium storing a software program for realizing the function of each of the embodiments, and causing the computer (CPU or MPU) of the system or the apparatus to read and execute a program code stored in the storage medium.

In such a case, the program code itself read from the storage medium realizes the function of each of the embodiments, and the storage medium storing the program code constitutes the invention. As the storage medium for supplying the program code, for example, one can be selected from a CD-ROM, a CD-R, a magnetic tape, a nonvolatile memory card, a ROM, and so on.

In addition, by executing the program code read by the computer, not only the function of each of the embodiments is realized but also an OS or the like operating on the computer executes a part or all of processing based on the instruction of the program code, and the function of each of the embodiment is realized by such processing. Needless to say, this latter case is also within the invention.

Furthermore, the program code read from the storage medium is written in a function expansion board incorporated in the computer or a function expansion unit connected to the computer, then a CPU or the like provided in the function expansion board or the function expansion unit executes a part or all of actual processing based on the instruction of the program code, and by such processing, the function of each of the embodiments is realized. Needless to say, this case is also within the invention.

As apparent from the foregoing, according to the present invention, when the past viewing and listening pattern of the user is stored as history information, and the videos and audio provided from a plurality of media are simultaneously outputted, it is possible to automatically determine the viewing and listening state of the input source preferred by the user based on the history information. As a result, the user can quickly and easily view and listens to a desired program or content in an optimum viewing and listening state.

What is claimed is:

1. A data processing apparatus, comprising:
input means for entering data;
display control means for controlling displaying means to display an image regarding the input data entered by said input means in a predetermined display state; and
storing means for storing attribute information of the input data and information regarding the display state in correspondence to each other, wherein said display control means performs control to select a display pattern according to the attribute information of the input data entered by the input means among display patterns stored in said storing means, and display the image regarding the input data in a display state according to the selected display pattern, and wherein said storing means stores the number of times of displaying the display pattern, and the display pattern in correspondence with each other, and said display control means selects a display pattern, the number of displaying times thereof being largest, among the display patterns according to the attribute information of the input data.

2. A data processing apparatus, comprising:

input means for entering data;

display control means for controlling displaying means to display an image regarding the input data entered by said input means in a predetermined display state; and storing means for storing attribute information of the input data and information regarding the display state in correspondence to each other, wherein said storing means stores the number of displaying times of the display pattern, and the display pattern in correspondence with each other for each predetermined time zone according to a date when the image regarding the input data is displayed.

3. An apparatus according to claim 2, wherein said display control means performs control to display a display pattern, the number of displaying times thereof being largest, in the predetermined time zone including predetermined time according to the reached predetermined time.

4. A data processing method, comprising:

an input step for entering data;

a display control step for controlling displaying means to display an image regarding input data entered in a predetermined display state; and a storing step for storing attribute information of the input data and information regarding the display state in correspondence with each other as a display pattern in storing means, wherein, in said display control step, control is performed to select a display pattern according to the attribute information of the input data entered by the input means among display patterns stored in the storing means, and display the image regarding the input data in a display state according to the selected display pattern; and wherein the storing means stores the number of times of displaying the display pattern, and the display pattern in correspondence with each other and, in said display control step, a display pattern, the number of displaying times thereof being largest, is selected among the display patterns according to the attribute information of the input data.

5. A data processing method, comprising an input step for entering data;

a display control step for controlling displaying means to display an image regarding input data entered in a predetermined display state; and a storing step for storing attribute information of the input data and information regarding the display state in correspondence with each other as a display pattern in storing means, wherein the storing means stores the number of displaying times of the display pattern, and the display pattern in correspondence with each other for each predetermined time zone according to a date when the image regarding the input data is displayed.

6. A method according to claim 5, wherein, in said display control step, control is performed to display a display pattern, the number of displaying times thereof being largest, in the predetermined time zone including predetermined time according to the reached predetermined time.

* * * * *

UNITED STATES PATENT AND TRADEMARK OFFICE
CERTIFICATE OF CORRECTION

| | |
|---|---|
| PATENT NO. | : 6,934,845 B2 |
| APPLICATION NO. | : 10/014397 |
| DATED | : September 13, 2005 |
| INVENTOR(S) | : Atsushi Mizutome et al. |

It is certified that error appears in the above-identified patent and that said Letters Patent is hereby corrected as shown below:

COLUMN 2
Line 30, "be" should read --to be --.

COLUMN 4
Line 65, "apparatus ID" should read --apparatus 1D--.
Line 67, "ID" should read --1D--.

COLUMN 5
Line 1, "apparatus ID" should read --apparatus 1D--.

COLUMN 6
Line 2, "PCMIA" should read --PCMCIA--.

COLUMN 9
Line 34, "relate" should read --related--.

COLUMN 10
Line 55, "sates" should read --states--.

COLUMN 11
Line 59, "A B" should read --A, B--.

COLUMN 12
Line 25, "listened" should read --listened to--.

COLUMN 14
Line 22, "the operates" should read --the user operates--.

COLUMN 16
Line 8, "listening" should read --listening to--.

COLUMN 18
Line 16, "member" should read --members--.

COLUMN 20
Line 66, "BORADSCATING" should read --BROADCASTING--.

UNITED STATES PATENT AND TRADEMARK OFFICE
CERTIFICATE OF CORRECTION

PATENT NO. : 6,934,845 B2
APPLICATION NO. : 10/014397
DATED : September 13, 2005
INVENTOR(S) : Atsushi Mizutome et al.

It is certified that error appears in the above-identified patent and that said Letters Patent is hereby corrected as shown below:

COLUMN 21
Line 8, "show" should read --shows--.
Line 27, "listening" should read --listening to--.
Line 38, "view" should read --viewed--.
Line 59, "pattern" should read --patterns--.

COLUMN 22
Line 55, "listens" should read --listen--.

COLUMN 24
Line 17, "comprising" should read --comprising:--.

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,943,845 B2
APPLICATION NO. : 10/014397
DATED : September 13, 2005
INVENTOR(S) : Atsushi Mizutome et al.

It is certified that error appears in the above-identified patent and that said Letters Patent is hereby corrected as shown below:

COLUMN 2
Line 30, "be" should read --to be --.

COLUMN 4
Line 65, "apparatus ID" should read --apparatus 1D--.
Line 67, "ID" should read --1D--.

COLUMN 5
Line 1, "apparatus ID" should read --apparatus 1D--.

COLUMN 6
Line 2, "PCMIA" should read --PCMCIA--.

COLUMN 9
Line 34, "relate" should read --related--.

COLUMN 10
Line 55, "sates" should read --states--.

COLUMN 11
Line 59, "A B" should read --A, B--.

COLUMN 12
Line 25, "listened" should read --listened to--.

COLUMN 14
Line 22, "the operates" should read --the user operates--.

COLUMN 16
Line 8, "listening" should read --listening to--.

COLUMN 18
Line 16, "member" should read --members--.

COLUMN 20
Line 66, "BORADSCATING" should read --BROADCASTING--.

UNITED STATES PATENT AND TRADEMARK OFFICE
CERTIFICATE OF CORRECTION

PATENT NO. : 6,943,845 B2
APPLICATION NO. : 10/014397
DATED : September 13, 2005
INVENTOR(S) : Atsushi Mizutome et al.

It is certified that error appears in the above-identified patent and that said Letters Patent is hereby corrected as shown below:

COLUMN 21
Line 8, "show" should read --shows--.
Line 27, "listening" should read --listening to--.
Line 38, "view" should read --viewed--.
Line 59, "pattern" should read --patterns--.

COLUMN 22
Line 55, "listens" should read --listen--.

COLUMN 24
Line 17, "comprising" should read --comprising:--.

Signed and Sealed this

Nineteenth Day of December, 2006

JON W. DUDAS
*Director of the United States Patent and Trademark Office*